(12) United States Patent  
Nagatomi

(10) Patent No.: US 8,264,937 B2  
(45) Date of Patent: Sep. 11, 2012

(54) OPTICAL PICKUP DEVICE

(75) Inventor: Kenji Nagatomi, Kaizu (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 13/238,278

(22) Filed: Sep. 21, 2011

(65) Prior Publication Data

US 2012/0082020 A1    Apr. 5, 2012

(30) Foreign Application Priority Data

Sep. 30, 2010  (JP) ................................ 2010-222422

(51) Int. Cl.  
*G11B 7/00* (2006.01)

(52) U.S. Cl. .................................. 369/112.04; 369/120

(58) Field of Classification Search .................. None  
See application file for complete search history.

(56) References Cited

U.S. PATENT DOCUMENTS

| | | | |
|---|---|---|---|
| 2010/0080106 A1 | 4/2010 | Nagatomi et al. | |
| 2010/0214902 A1* | 8/2010 | Nakano et al. | 369/112.03 |
| 2010/0265809 A1* | 10/2010 | Kimura | 369/112.03 |

FOREIGN PATENT DOCUMENTS

| | | |
|---|---|---|
| JP | 2006-73042 A | 3/2006 |
| JP | 2010-102813 A | 5/2010 |

* cited by examiner

*Primary Examiner* — Paul Huber  
(74) *Attorney, Agent, or Firm* — Ditthavong Mori & Steiner, P.C.

(57) ABSTRACT

An astigmatism element converges laser light in first and second directions to generate focal lines. A spectral element makes propagating directions of light fluxes entered into first through fourth areas different from each other to disperse the four light fluxes from each other. The direction along which the first and second areas are aligned is in parallel to a direction of a track image of a recording medium projected onto the spectral element. Each of the first and second areas has a surface area larger than a surface area of each of the third and fourth areas, and a boundary portion between the first and second areas, and the third and fourth areas includes a straight portion extending in a direction perpendicular to the direction of the track image.

6 Claims, 20 Drawing Sheets

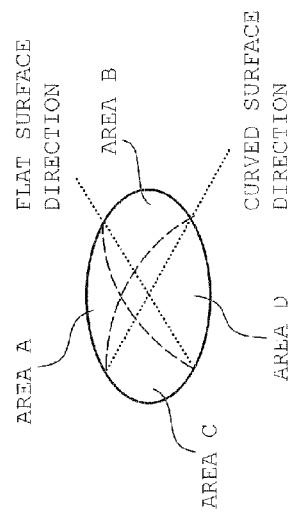
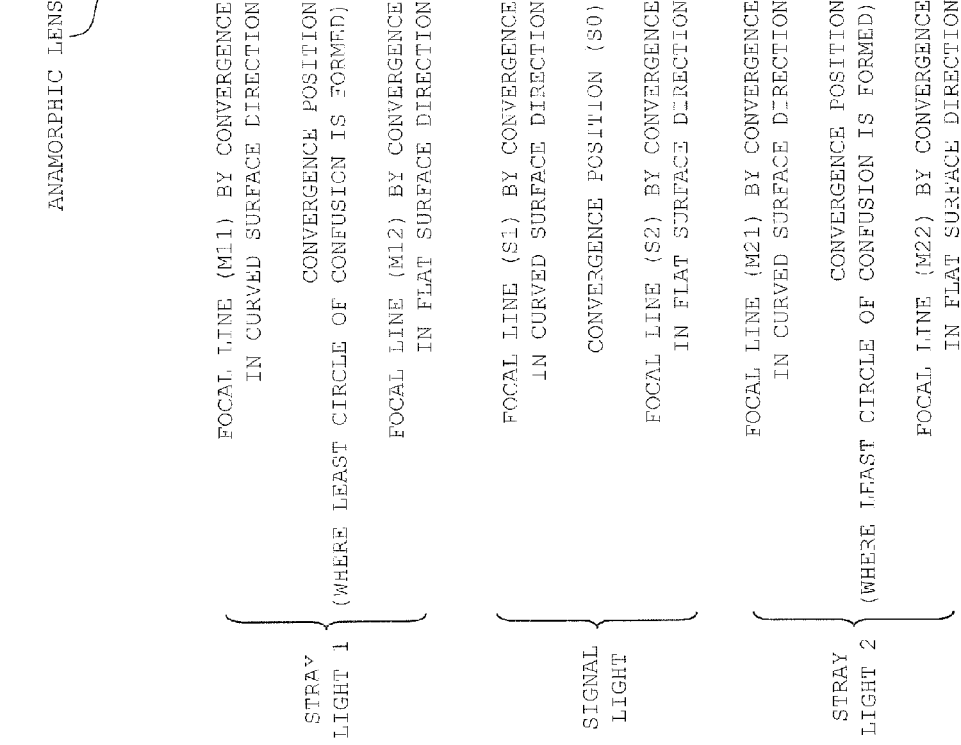

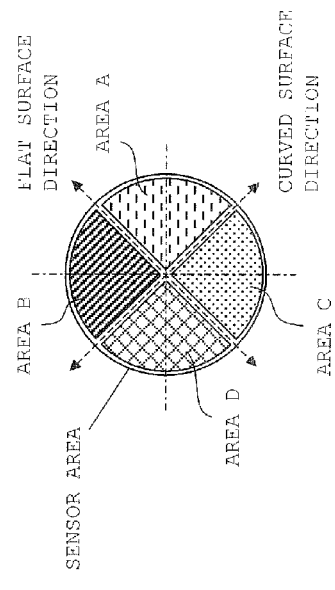
FIG.2A  LIGHT FLUX DIVIDING PATTERN
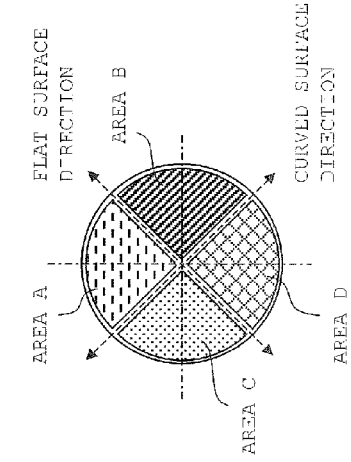
FIG.2B  SIGNAL LIGHT
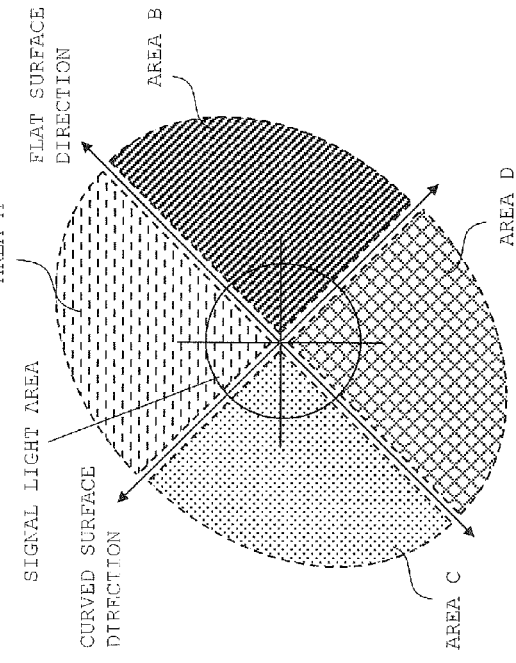
FIG.2C  STRAY LIGHT 1
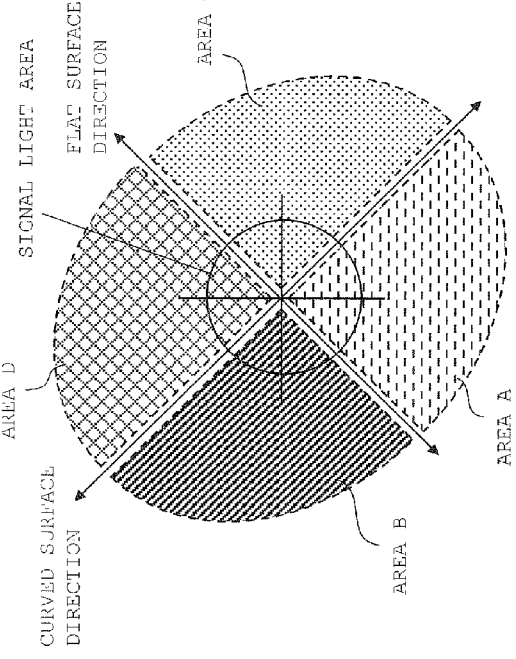
FIG.2D  STRAY LIGHT 2

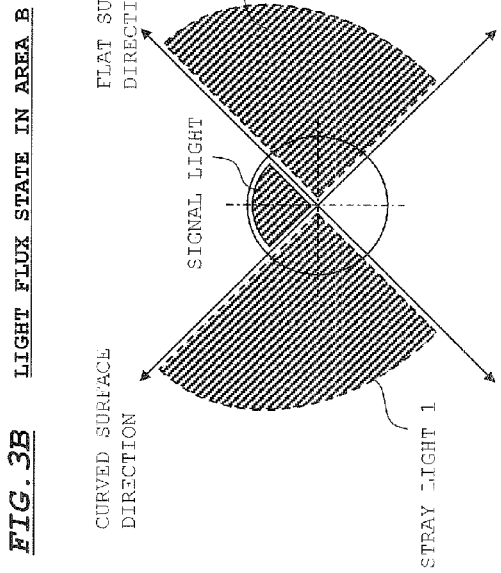
FIG. 3A   LIGHT FLUX STATE IN AREA A
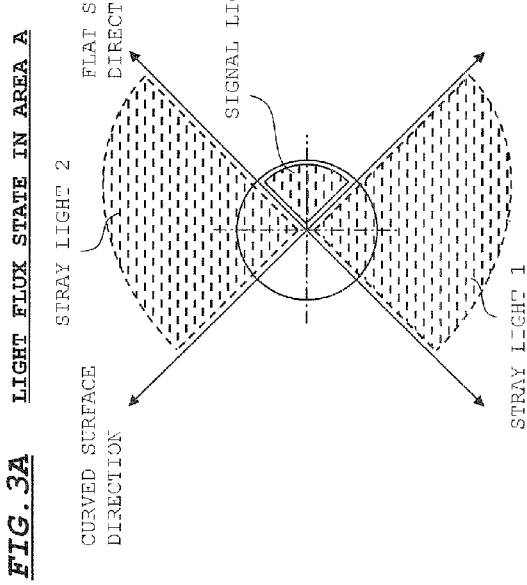
FIG. 3C   LIGHT FLUX STATE IN AREA C
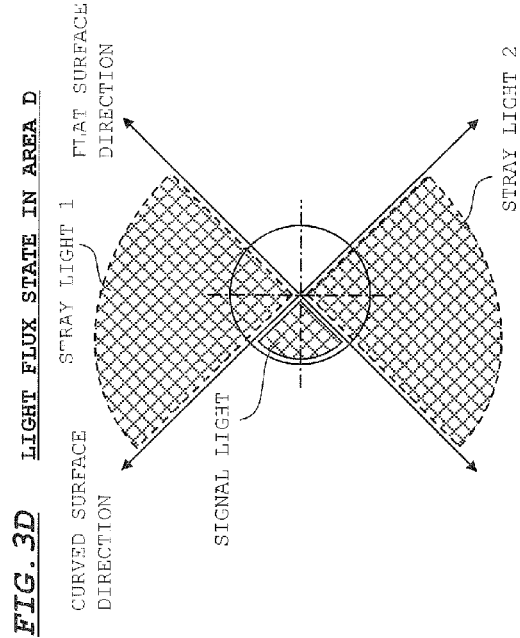
FIG. 3B   LIGHT FLUX STATE IN AREA B
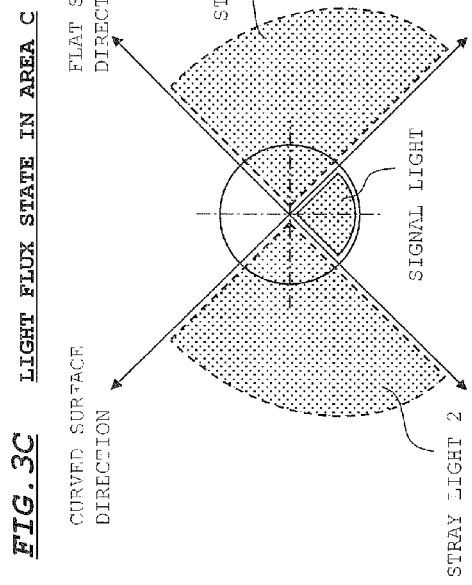
FIG. 3D   LIGHT FLUX STATE IN AREA D

PROVIDE ANGLAR CHANGE TO EACH AREA

LIGHT FLUX ON PLANE S0

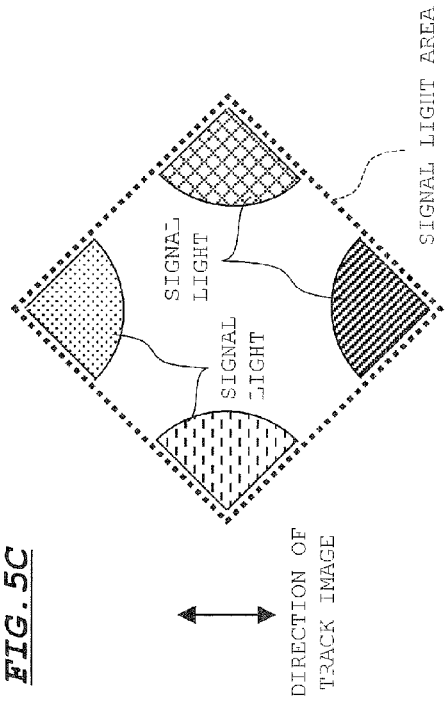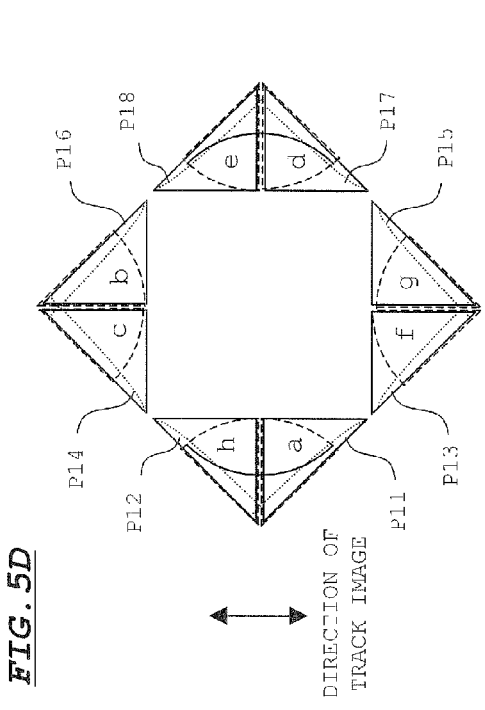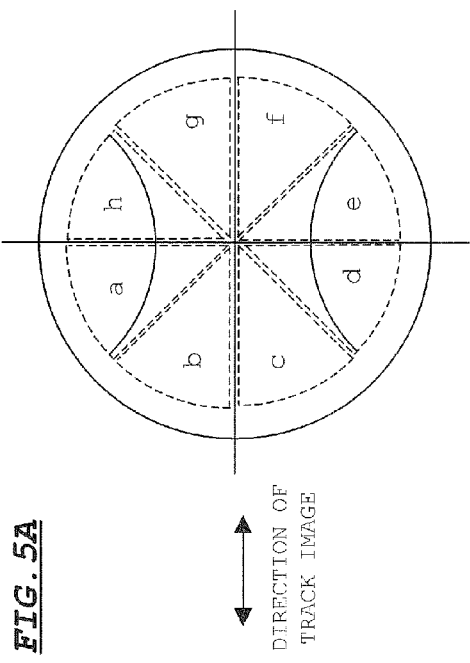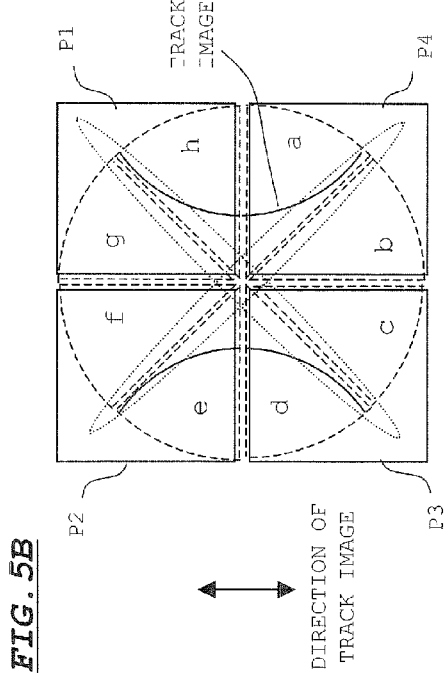

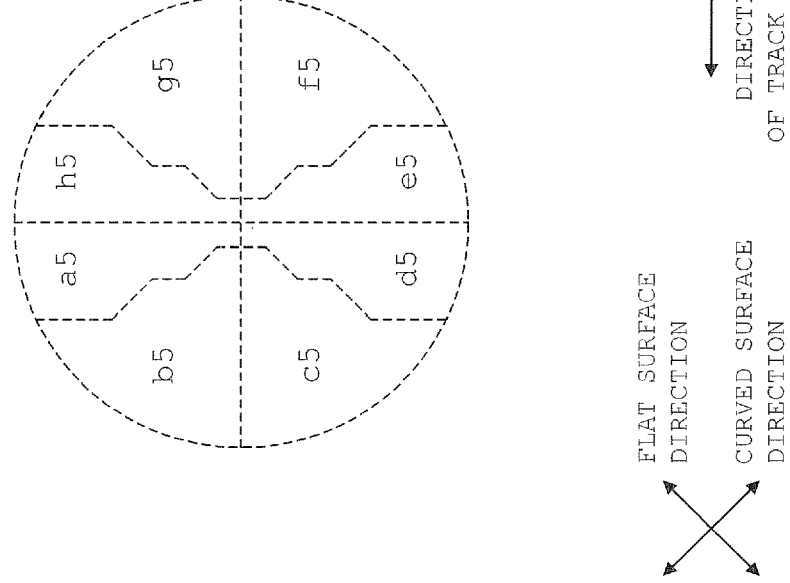
FIG.13B
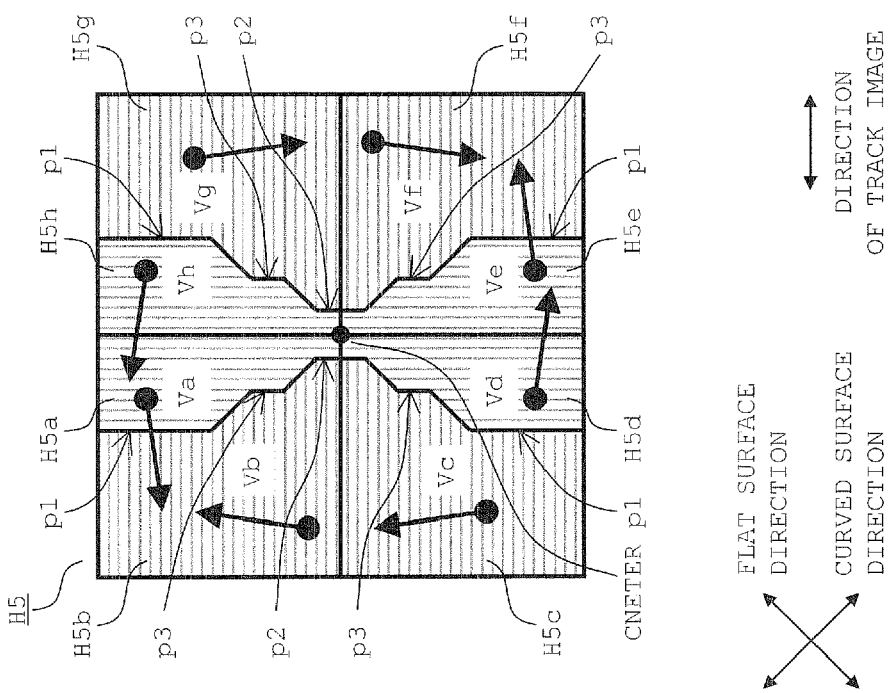
FIG.13A   LENS FUNCTION IS GIVEN

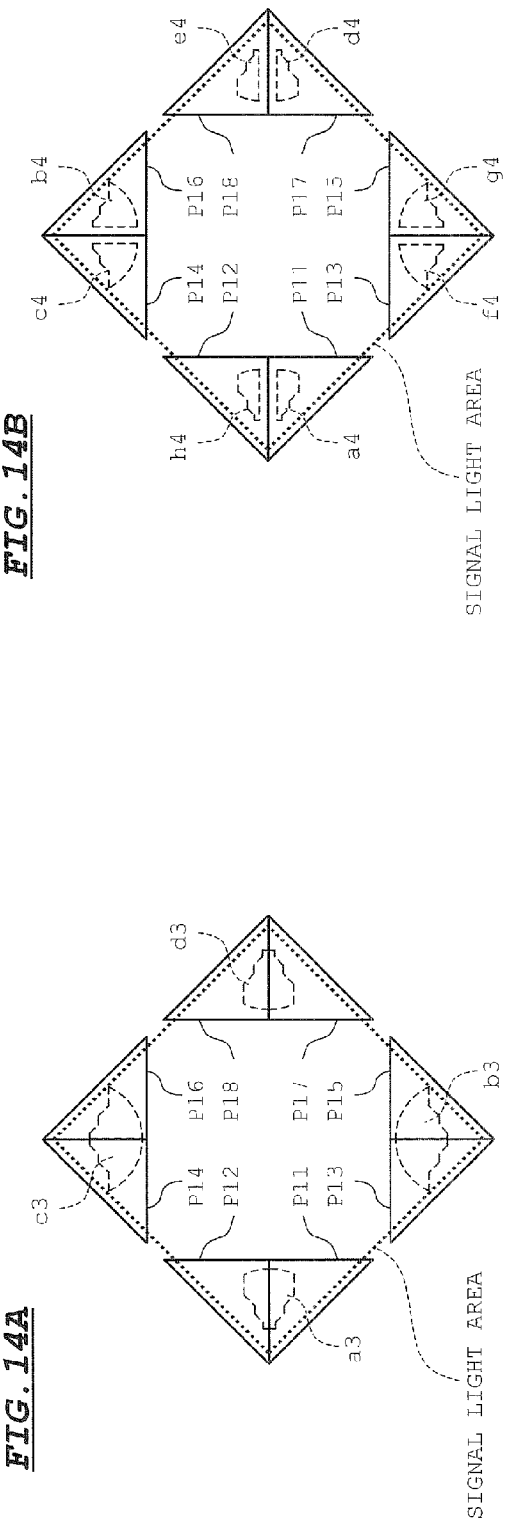
FIG. 14A
FIG. 14B
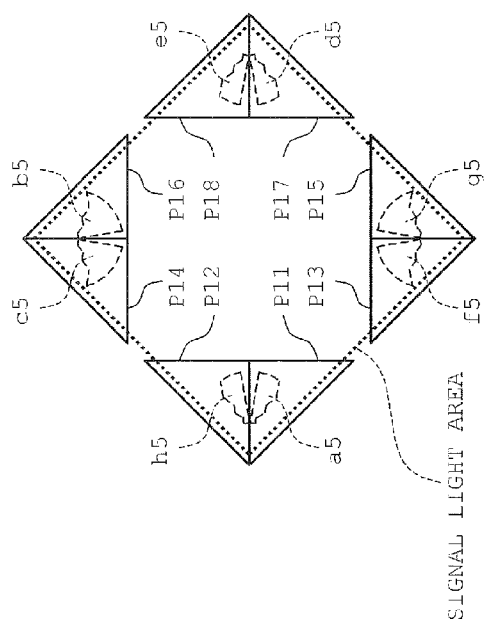
FIG. 14C

OPTICAL PICKUP DEVICE

This application claims priority under 35 U.S.C. Section 119 of Japanese Patent Application No. 2010-222422 filed Sep. 30, 2010, entitled "OPTICAL PICKUP DEVICE". The disclosure of the above application is incorporated herein by reference.

BACKGROUND OF THE INVENTION

1. Technical Field of the Invention

The invention relates to an optical pickup device, and more particularly to a device suitable for use in irradiating a recording medium having plural laminated recording layers with laser light.

2. Disclosure of Related Art

In recent years, as the capacity of an optical disc has been increased, an optical disc having an increased number of recording layers has been developed. Laminating recording layers in a disc enables to considerably increase the data capacity of the disc. In the case where recording layers are laminated, generally, two recording layers are laminated on one side of a disc. Recently, however, laminating three or more recording layers on one side of a disc has been put into practice to further increase the capacity of the disc. Thus, the capacity of a disc can be increased by increasing the number of recording layers to be laminated. However, as the number of recording layers to be laminated is increased, the distance between the recording layers is decreased, and signal deterioration resulting from an interlayer crosstalk is increased.

As the number of recording layers to be laminated is increased, reflection light from a recording layer (a targeted recording layer) to be recorded/reproduced is reduced. As a result, if unwanted reflection light (stray light) is entered into a photodetector from a recording layer on or under the targeted recording layer, a detection signal may be deteriorated, which may adversely affect focus servo control and tracking servo control. In view of this, in the case where a large number of recording layers are laminated, it is necessary to properly remove stray light, and stabilize a signal from a photodetector.

Japanese Unexamined Patent Publication No. 2010-102813 (corresponding to U.S. Patent Application Publication No. US2010/0080166 A1) discloses an arrangement of an optical pickup device that enables to properly remove stray light, and suppress an offset (a DC component) of a tracking error signal, in the case where a large number of recording layers are formed in an optical disc. With this arrangement, it is possible to form an area where only signal light exists, on a light receiving surface of a photodetector. It is possible to suppress an influence of stray light on a detection signal by disposing sensors of the photodetector in the signal light area. Further, with this arrangement, it is possible to suppress an offset (a DC component) of a tracking error signal resulting from shift of an objective lens with respect to an optical axis of laser light.

In the above optical pickup device, a tracking error signal is generated by subtracting, from a signal component reflecting a push-pull component, a signal obtained by multiplying a signal component reflecting a DC component with a variable k to suppress an offset (a DC component) of a tracking error signal. In the above arrangement, if noise is included in a signal component reflecting a DC component, an influence of noise on a tracking error signal may be increased.

SUMMARY OF THE INVENTION

A main aspect of the invention relates to an optical pickup device. The optical pickup device according to the main aspect includes a laser light source; an objective lens which focuses laser light emitted from the laser light source on a recording medium; an astigmatism element into which the laser light reflected on the recording medium is entered, and which converges the laser light in a first direction to generate a first focal line and converges the laser light in a second direction perpendicular to the first direction to generate a second focal line; a spectral element into which the laser light reflected on the recording medium is entered, and which makes propagating directions of light fluxes entered into first through fourth areas different from each other to disperse the four light fluxes from each other; and a photodetector which receives the dispersed light fluxes to output a detection signal. Assuming that an intersection of first and second straight lines respectively in parallel to the first direction and the second direction and perpendicularly intersecting with each other is aligned with a center of the spectral element, the first and second areas are disposed in a direction along which a pair of vertically opposite angles defined by the first and second straight lines are aligned, and the third and fourth areas are disposed in a direction along which the other pair of vertically opposite angles defined by the first and second straight lines are aligned. The astigmatism element is disposed at such a position that the direction along which the first and second areas are aligned is in parallel to a direction of a track image of the recording medium projected onto the spectral element. Each of the first and second areas has a surface area larger than a surface area of each of the third and fourth areas, and a boundary portion between the first and second areas, and the third and fourth areas includes a straight portion extending in a direction perpendicular to the direction of the track image.

BRIEF DESCRIPTION OF THE DRAWINGS

These and other objects, and novel features of the present invention will become more apparent upon reading the following detailed description of the embodiment along with the accompanying drawings.

FIGS. 1A and 1B are diagrams for describing a technical principle (as to how light rays converge) in an embodiment of the invention.

FIGS. 2A through 2D are diagrams for describing the technical principle (as to how light fluxes are distributed) in the embodiment.

FIGS. 3A through 3D are diagrams for describing the technical principle (as to how signal light and stray light are distributed) in the embodiment.

FIGS. 5A through 5D are diagrams for describing a method for arranging sensors in the embodiment.

FIGS. 13A and 13B are diagrams showing a modification example of the spectral element based on the technical principle of the embodiment.

FIGS. 14A through 14C are diagrams showing irradiation areas on sensors based on the technical principle of the embodiment.

Figure 4A:
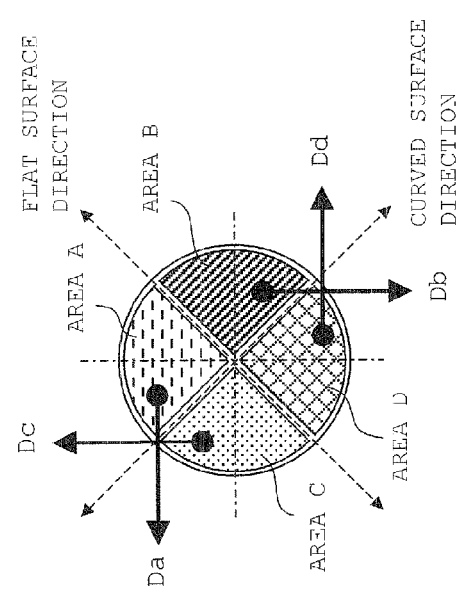
FIGS. 4A and 4B are diagrams for describing the technical principle (a method for separating light fluxes) in the embodiment.

The drawings are provided mainly for describing the present invention, and do not limit the scope of the present invention.

DESCRIPTION OF PREFERRED EMBODIMENTS

In the following, an embodiment of the invention is described referring to the drawings.

Technical Principle

First, a technical principle to which the embodiment of the invention is applied is described referring to FIGS. 1A through 6.

FIG. 1A is a diagram showing a state as to how light rays are converged. FIG. 1A is a diagram showing a state as to how laser light (signal light) reflected on a target recording layer, laser light (stray light 1) reflected on a layer located at a rearward position with respect to the target recording layer, and laser light (stray light 2) reflected on a layer located at a forward position with respect to the target recording layer are converged. FIG. 1B is a diagram showing an arrangement of an anamorphic lens to be used in the technical principle.

Referring to FIG. 1B, the anamorphic lens has a function of converging laser light to be entered in a direction in parallel to the lens optical axis, in a curved surface direction and a flat surface direction. The curved surface direction and the flat surface direction intersect perpendicularly to each other. Further, the curved surface direction has a smaller radius of curvature than that of the flat surface direction, and has a greater effect of converging laser light to be entered into the anamorphic lens.

To simplify the description on the astigmatism function of the anamorphic lens, the terms "curved surface direction" and "flat surface direction" are used. Actually, however, as far as the anamorphic lens has a function of forming focal lines at different positions from each other, the shape of the anamorphic lens in the "flat surface direction" in FIG. 1B is not limited to a flat plane shape. In the case where laser light is entered into the anamorphic lens in a convergence state, the shape of the anamorphic lens in the "flat surface direction" may be a straight line shape (where the radius of curvature=∞).

Referring to FIG. 1A, signal light converged by the anamorphic lens forms focal lines at different positions from each other by convergence in the curved surface direction and in the flat surface direction. The focal line position (S1) of signal light by convergence in the curved surface direction is close to the anamorphic lens than the focal line position (S2) of signal light by convergence in the flat surface direction, and the convergence position (S0) of signal light is an intermediate position between the focal line positions (S1) and (S2) by convergence in the curved surface direction and in the flat surface direction.

Similarly to the above, the focal line position (M11) of stray light 1 converged by the anamorphic lens by convergence in the curved surface direction is close to the anamorphic lens than the focal line position (M12) of stray light 1 by convergence in the flat surface direction. The anamorphic lens is designed to make the focal line position (M12) of stray light 1 by convergence in the flat surface direction close to the anamorphic lens than the focal line position (S1) of signal light by convergence in the curved surface direction.

Similarly to the above, the focal line position (M21) of stray light 2 converged by the anamorphic lens in the curved surface direction is close to the anamorphic lens than the focal line position (M22) of stray light 2 by convergence in the flat surface direction. The anamorphic lens is designed to make the focal line position (M21) of stray light 2 by convergence in the curved surface direction away from the anamorphic lens than the focal line position (S2) of signal light by convergence in the flat surface direction.

Further, the beam spot of signal light has a shape of a least circle of confusion on the convergence position (S0) between the focal line position (S1) and the focal line position (S2).

Taking into account the above matters, the following is a description about a relationship between irradiation areas of signal light and stray light 1, 2 on the plane S0.

As shown in FIG. 2A, the anamorphic lens is divided into four areas A through D. In this case, signal light entered into the areas A through D is distributed on the plane S0, as shown in FIG. 2B. Further, stray light 1 entered into the areas A through D is distributed on the plane S0, as shown in FIG. 2C, and stray light 2 entered into the areas A through D is distributed on the plane S0, as shown in FIG. 2D.

If signal light and stray light 1, 2 on the plane S0 are extracted in each of light flux areas, the distributions of the respective light are as shown in FIGS. 3A through 3D. In this case, stray light 1 and stray light 2 in the same light flux area are not overlapped with signal light in each of the light flux areas. Accordingly, if the device is configured such that only signal light is received by a sensor after light fluxes (signal light, stray light 1, 2) in each of the light flux areas are separated in different directions, only signal light is entered into a corresponding sensor to thereby suppress incidence of stray light. Thus, it is possible to avoid degradation of a detection signal resulting from stray light.

As described above, it is possible to extract only signal light by dispersing and separating light passing through the areas A through D from each other on the plane S0. The embodiment is made based on the above technical principle.

Figure 4B:
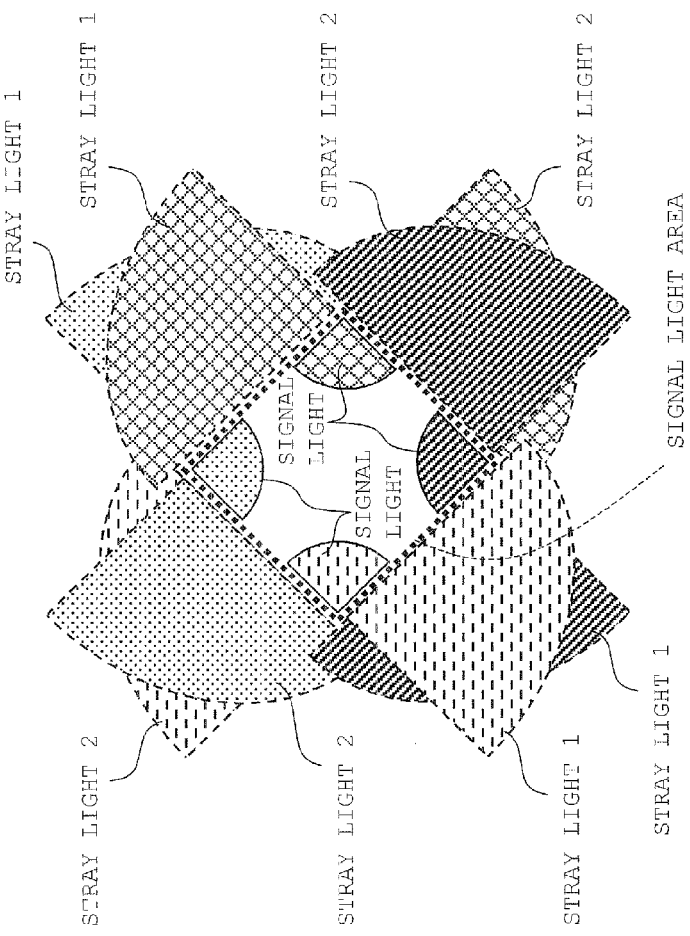

FIGS. 4A and 4B are diagrams showing a distribution state of signal light and stray light 1, 2 on the plane S0, in the case where the propagating directions of light fluxes (signal light, stray light 1, 2) passing through the four areas A through D shown in FIG. 2A are respectively changed in different directions by the same angle. FIG. 4A is a diagram of the anamorphic lens when viewed from the optical axis direction of the anamorphic lens (the propagating direction along which laser light is entered into the anamorphic lens), and FIG. 4B is a diagram showing a distribution state of signal light, stray light 1, 2 on the plane S0.

In FIG. 4A, the propagating directions of light fluxes (signal light, stray light 1, 2) that have passed through the areas A through D are respectively changed into directions Da, Db, Dc, Dd by the same angle amount a (not shown) with respect to the propagating directions of the respective light fluxes before incidence. The directions Da, Db, Dc, Dd each has an inclination of 45° with respect to the flat surface direction and the curved surface direction.

In this case, as shown in FIG. 4B, it is possible to distribute signal light and stray light 1, 2 in each of the light flux areas, on the plane S0, by adjusting the angle amount a with respect to the directions Da, Db, Dc, Dd. As a result of the above operation, as shown in FIG. 4B, it is possible to form a signal light area where only signal light exists on the plane S0. By disposing sensors of a photodetector in the signal light area, it is possible to receive only signal light in each of the light flux areas by a corresponding sensor.

FIGS. 5A through 5D are diagrams showing a method for arranging sensors. FIG. 5A is a diagram showing light flux areas of reflected light (signal light) on a disc, and FIG. 5B is a diagram showing a distribution state of signal light on a photodetector, in the case where an anamorphic lens and a photodetector (a four-divided sensor) based on a conventional astigmatism method are respectively disposed on the arranged position of the anamorphic lens and on the plane S0, in the arrangement shown in FIG. 1A. FIGS. 5C and 5D are diagrams showing a distribution state of signal light and a sensor layout based on the above principle, on the plane S0.

The direction of a diffraction image (a track image) of signal light resulting from a track groove has an inclination of 45° with respect to the flat surface direction and the curved surface direction. In FIG. 5A, assuming that the direction of a track image is aligned with leftward and rightward directions, in FIGS. 5B through 5D, the direction of a track image by signal light is aligned in upward and downward directions. In FIGS. 5A and 5B, to simplify the description, a light flux is divided into eight light flux areas a through h. Further, the track image is shown by the solid line, and the beam shape in an out-of-focus state is shown by the dotted line.

It is known that an overlapped state of a zero-th order diffraction image and a first-order diffraction image of signal light resulting from a track groove is obtained by an equation: wavelength/(track pitch×objective lens NA). As shown in FIGS. 5A, 5B, 5D, a requirement that a first-order diffraction image is formed in the four light flux areas a, b, e, h is expressed by: wavelength track pitch×objective lens NA>√2.

In the conventional astigmatism method, sensors P1 through P4 (a four-divided sensor) of a photodetector are arranged as shown in FIG. 5B. In this case, assuming that detection signal components based on light intensities in the light flux areas a through h are expressed by A through H, a focus error signal FE and a push-pull signal PP are obtained by the following equations (1) and (2).

$$FE=(A+B+E+F)-(C+D+G+H) \quad (1)$$

$$PP=(A+B+G+H)-(C+D+E+F) \quad (2)$$

On the other hand, as described above, signal light is distributed in the signal light area as shown in FIG. 5C in the distribution state shown in FIG. 4B. In this case, signal light passing through the light flux areas a through h shown in FIG. 5A is distributed as shown in FIG. 5D. Specifically, signal light passing through the light flux areas a through h in FIG. 5A are guided to the light flux areas a through h shown in FIG. 5D, on the plane S0 where the sensors of the photodetector are disposed.

Accordingly, by disposing the sensors P11 through P18 at the positions of the light flux areas a through h shown in FIG. 5D in an overlapped state as shown in FIG. 5D, it is possible to generate a focus error signal and a push-pull signal by performing the same computation as applied to the process described in the case of FIG. 5B. Specifically, assuming that A through H represent detection signals from the sensors for receiving light fluxes in the light flux areas a through h, a focus error signal FE and a push-pull signal PP can be acquired by the above equations (1) and (2) in the same manner as described in the case of FIG. 5B.

As described above, according to the above principle, it is possible to generate a focus error signal and a push-pull signal (a tracking error signal) with no or less influence of stray light by performing the same computation as applied to the process based on the conventional astigmatism method.

Figure 6:
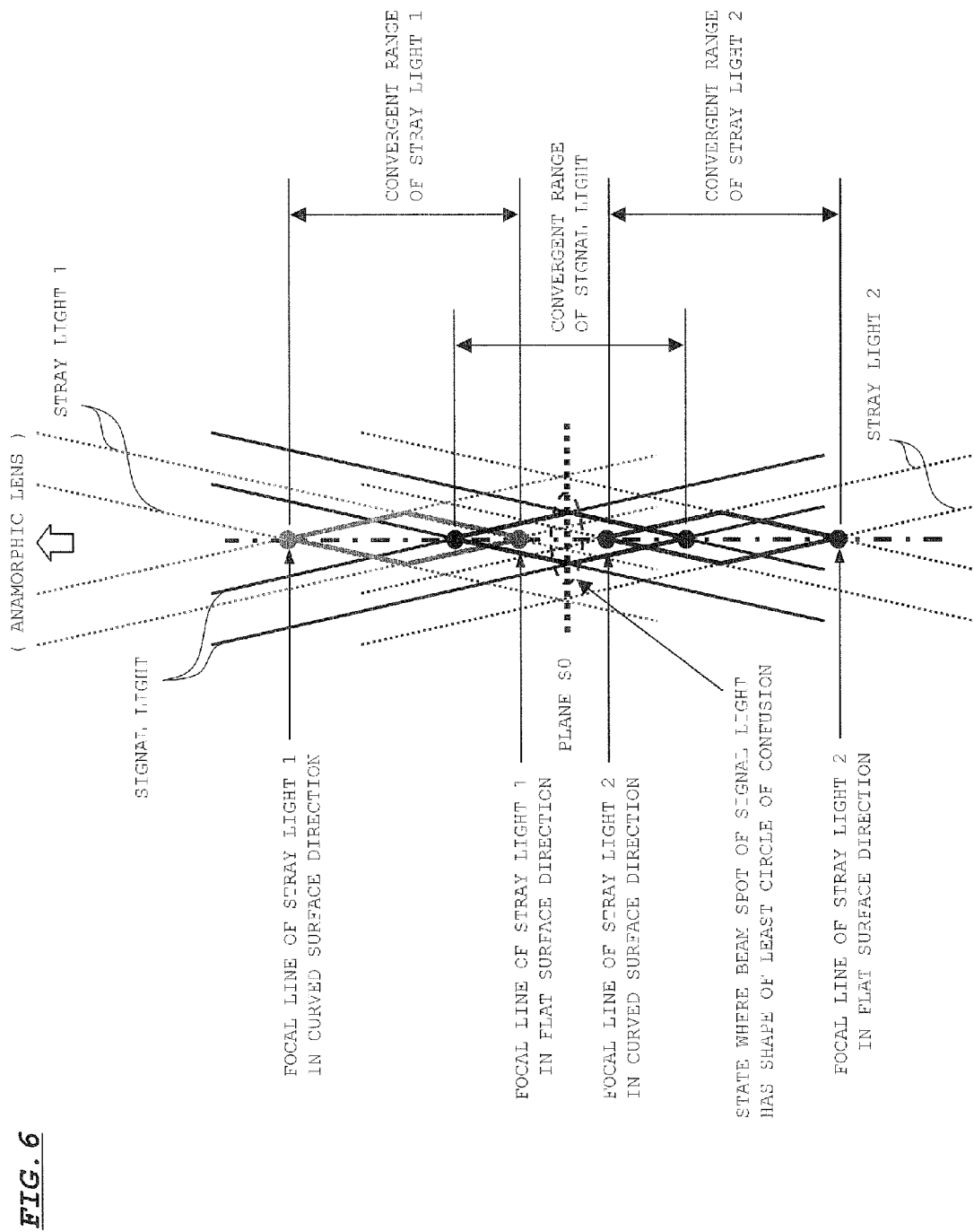
FIG. 6 is a diagram showing a preferable range to which the technical principle of the embodiment is applied.

The effect by the above principle is obtained, as shown in FIG. 6, in the case where the focal line position of stray light 1 in the flat surface direction is close to the anamorphic lens with respect to the plane S0 (a plane where the beam spot of signal light has a shape of a least circle of confusion), and the focal line position of stray light 2 in the curved surface direction is away from the anamorphic lens with respect to the plane S0. Specifically, as far as the above relationship is satisfied, the distribution state of signal light, and stray light 1, 2 is as shown in FIG. 4B, which makes it possible to keep signal light, and stray light 1, 2 from overlapping each other on the plane S0. In other words, as far as the above relationship is satisfied, the advantage based on the above principle is obtained, even if the focal line position of stray light 1 in the flat surface direction comes closer to the plane S0 than the focal line position of signal light in the curved surface direction, or even if the focal line position of stray light 2 in the curved surface direction comes closer to the plane S0 than the focal line position of signal light in the flat surface direction.

In the following, there is described a case where a spectral element H0 based on the above principle is used to distribute signal light passing through the eight light flux areas a through h shown in FIG. 5A, on the sensor layout shown in FIG. 5D.

Figure 7A:
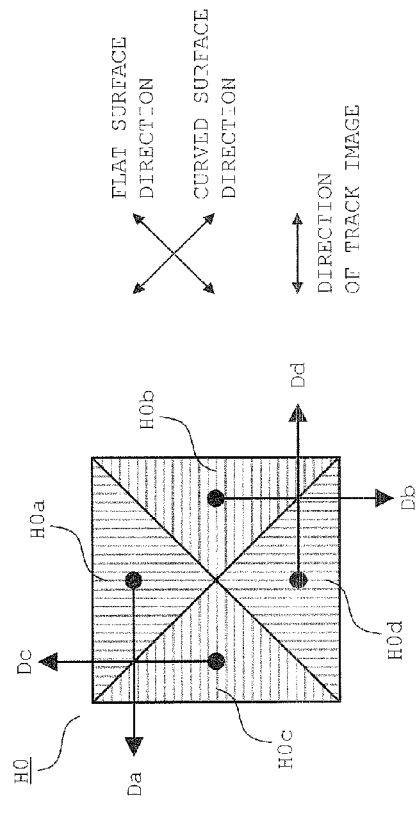
FIGS. 7A and 7B are diagrams showing an arrangement of a spectral element and a circuit configuration for suppressing an offset (a DC component) of a push-pull signal based on the technical principle of the embodiment.

FIG. 7A is a diagram showing an arrangement of the spectral element H0. FIG. 7A is a plan view of the spectral element H0, when viewed from a light incident surface thereof. FIG. 7A also shows the flat surface direction and the curved surface direction of the anamorphic lens shown in FIG. 1B, and the direction of a track image of laser light to be entered into the spectral element H0.

The spectral element H0 is made of a square transparent plate, and has a diffraction pattern (a diffraction hologram) on a light incident surface thereof. As shown in FIG. 7A, the light incident surface of the spectral element H0 is divided into four diffraction areas H0a through H0d. The spectral element H0 is disposed at such a position that laser light passing through the light flux areas A through D shown in FIG. 4A are respectively entered into the diffraction areas H0a through H0d. The diffraction areas H0a through H0d respectively diffract the entered laser light in the directions Da through Dd shown in FIG. 4A by diffraction of the diffraction areas H0a through H0d.

In the above arrangement, if an objective lens is shifted in a direction perpendicular to the direction of a track image in generating a push-pull signal PP based on detection signals from the sensors P11 through P18 shown in FIG. 5D, an offset (a DC component) is superimposed on the push-pull signal PP. A method for suppressing an offset (a DC component) of a push-pull signal PP resulting from shift of the objective lens (hereinafter, called as "lens shift") as described above is disclosed in Japanese Unexamined Patent Publication No. 2010-102813 of the patent application filed by the applicant of the present application. The method is described referring to FIG. 7B.

Figure 7B:
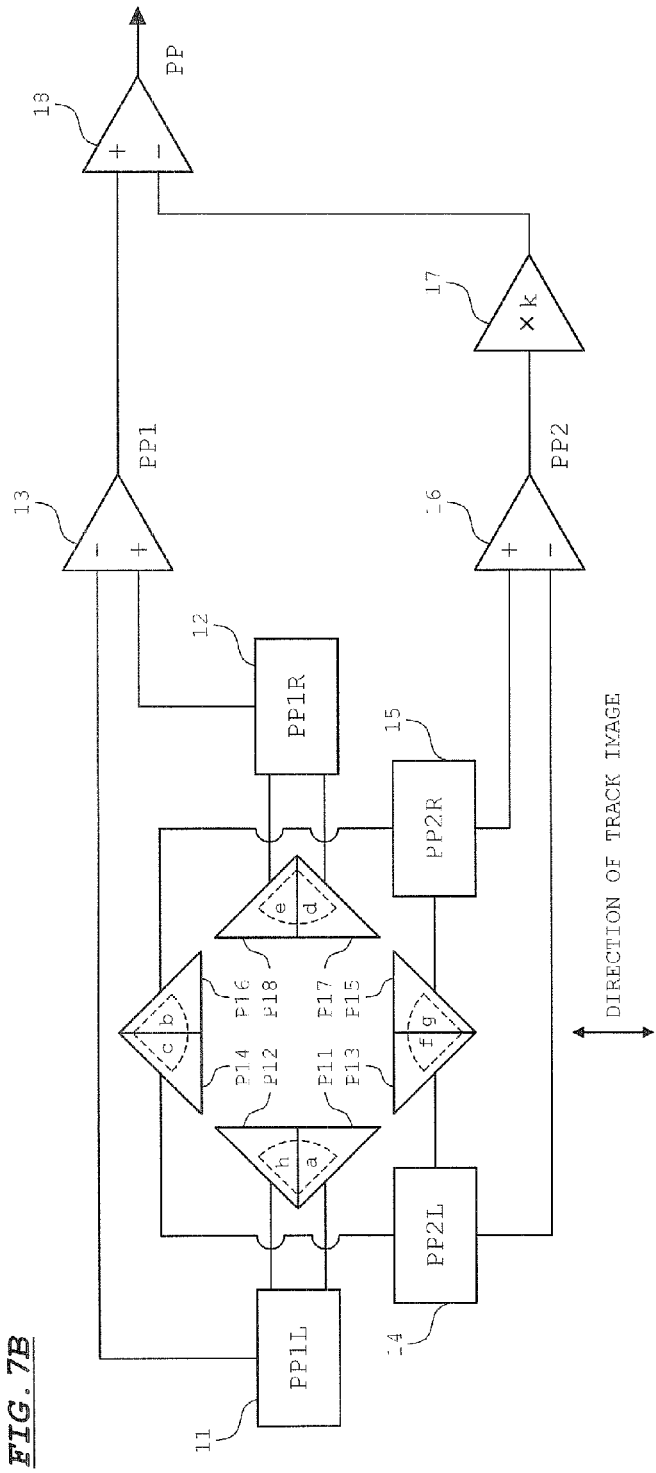

FIG. 7B is a diagram showing a circuit configuration for suppressing an offset (a DC component) of a push-pull signal PP. The push-pull signal generation circuit in the above case is provided with adder circuits 11, 12, 14, 15, subtractor circuits 13, 16, 18, and a multiplier circuit 17.

The adder circuit 11 sums up output signals from the sensors P11, P12, and outputs a signal PP1L in accordance with the light amount of left-side signal light. The adder circuit 12 sums up output signals from the sensors P17, P18, and outputs a signal PP1R in accordance with the light amount of right-side signal light. The subtractor circuit 13 computes a difference between output signals from the adder circuits 11, 12, and generates a signal PP1 based on a light amount difference between the left and right two signal light.

The adder circuit 14 sums up output signals from the sensors P13, P14, and outputs a signal PP2L in accordance with the light amount of left-side signal light of upper and lower two signal light. The adder circuit 15 sums up output signals from the sensors P15, P16, and outputs a signal PP2R in accordance with the light amount of right-side signal light of upper and lower two signal light. The subtractor circuit 16 computes a difference between output signals from the adder circuits 14, 15, and generates a signal PP2 based on a light amount difference in leftward or rightward direction between the upper and lower two signal light.

The multiplier circuit 17 outputs a signal obtained by multiplying the signal PP2 to be outputted from the subtractor circuit 16 with a variable k to the subtractor circuit 18. The subtractor circuit 18 subtracts a signal to be inputted from the multiplier circuit 17, from the signal PP1 to be inputted from the subtractor circuit 13; and outputs a signal after the subtraction as a push-pull signal PP. The variable k is set to such a value that an offset (a DC component) of the signal PP1 by lens shift is cancelled out by the signal PP2 multiplied with the variable k. In this way, an offset (a DC component) of the push-pull signal PP is suppressed.

In the above arrangement, if there is a large difference between the signal PP1 and the signal PP2, the value of the variable k is set to a large value. In such a case, for instance, if noise is included in the signal PP2 resulting from slight incidence of stray light into a sensor, the signal PP2 including the noise may be multiplied with the variable k which is set to a large value. As a result, an influence of noise on the push-pull signal PP may be seriously increased.

In view of the above, the inventor of the present application has conceived an idea of modifying the borderlines between the diffraction areas H0a through H0d of the spectral element H0 to suppress a difference between the signal PP1 and the signal PP2, and set the value of the variable k to a small value. In the following, there are described spectral elements H1 through H5, in each of which the diffraction areas of the spectral element H0 are modified.

Figure 8A:
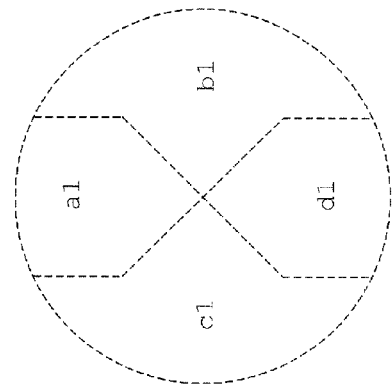
FIGS. 8A through 8D are diagrams showing a modification example of the spectral element based on the technical principle of the embodiment.
Figure 8B:
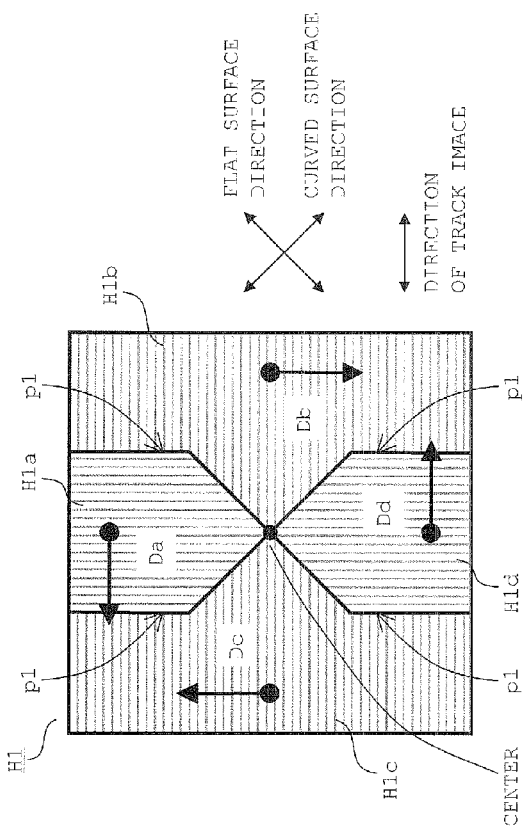

FIG. 8A is a diagram showing an arrangement of the spectral element H1. FIG. 8A is a plan view of the spectral element H1 when viewed from a light incident surface thereof. FIG. 8B is a diagram showing four light flux areas a1 through d1 which are divided in such a manner that laser light to be entered into the spectral element H1 corresponds to borderlines between diffraction areas of the spectral element H1. The flat surface direction and the curved surface direction of an anamorphic lens, and the direction of a track image of laser light to be entered into the spectral element H1 in FIGS. 8A, 8B are the same as those shown in FIG. 7A.

Referring to FIG. 8A, the light incident surface of the spectral element H1 is divided into diffraction areas H1a through H1d. The diffraction areas H1a and H1d are symmetrical with respect to a horizontally extending straight line and a vertically extending straight line which pass through the center of the spectral element H1. Further, the diffraction areas H1b and H1c are symmetrical with respect to the horizontally extending straight line and the vertically extending straight line which pass through the center of the spectral element H1. The borderline between the diffraction area H1a and the diffraction areas H1b includes a vertically extending straight portion p1 near the outer periphery of the spectral element H1. Likewise, the borderline between the diffraction areas H1a, H1c, the borderline between the diffraction areas H1b, H1d, and the borderline between the diffraction areas H1c, H1d each includes a vertically extending straight portion p1 near the outer periphery of the spectral element H1.

Further, the spectral element H1 is disposed at such a position that the center of the spectral element H1 is aligned with the optical axis of laser light, and laser light passing through the light flux areas a1 through d1 shown in FIG. 8B is respectively entered into the diffraction areas H1a through H1d. In this arrangement, the borderlines of the spectral element H1 are set in such a manner that track images included in the light fluxes to be entered into the spectral element H1 are sufficiently entered in the straight portions p1 of the spectral element H1. With this arrangement, the irradiation areas of laser light passing through the light flux areas a1, d1 on the diffraction areas H1a, H1d are set smaller than the irradiation areas of laser light passing through the light flux areas b1, c1 on the diffraction areas H1b, H1c.

Figure 9B:
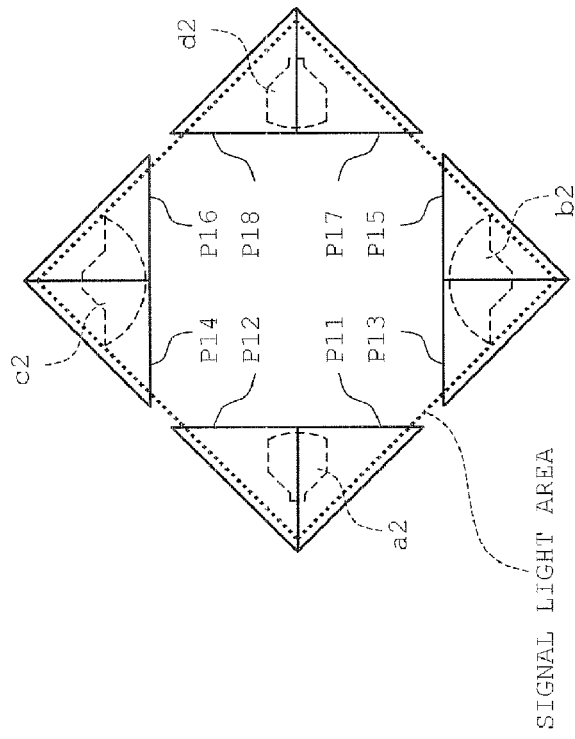
FIGS. 9A and 9B are diagrams showing irradiation areas on sensors based on the technical principle of the embodiment.
Figure 9A:
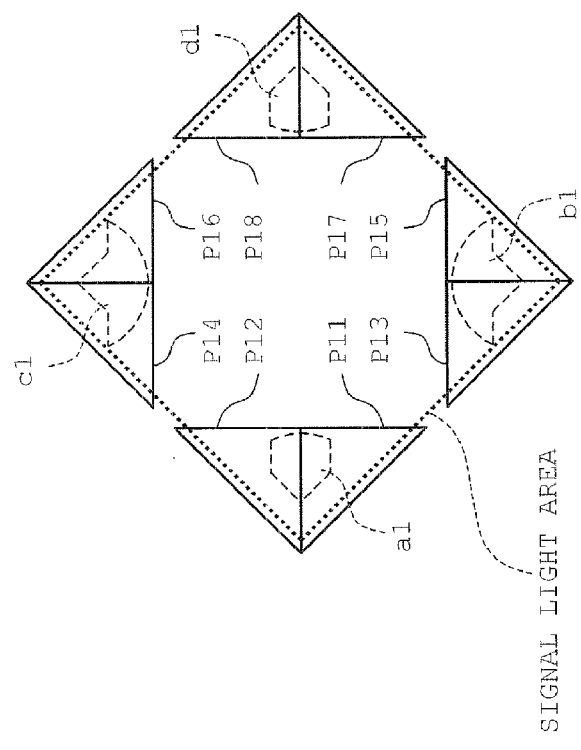

FIG. 9A is a schematic diagram showing irradiation areas, on the sensors P11 through P18, of laser light passing through the light flux areas a1 through d1 shown in FIG. 8B, by the spectral element H1 shown in FIG. 8A. FIG. 9A shows signal light of laser light to be irradiated onto the sensors P11 through P18, in the case where the focus position of laser light is adjusted on a target recording layer. To simplify the description, the irradiation areas of laser light passing through the light flux areas a1 through d1 are indicated as irradiation areas a1 through d1.

As shown in FIG. 9A, signal light of laser light passing through the light flux areas a1 through d1 is respectively irradiated onto the sensors P11, P12, the sensors P13, P15, the sensors P14, P16, and the sensors P17, P18. In this arrangement, stray light 1, 2 of laser light passing through the light flux areas a1 through d1 is irradiated onto a position on the outside of the signal light area substantially in the same manner as the state shown in FIG. 4B.

In the above arrangement, as described above, the irradiation areas of laser light passing through the light flux areas a1, d1 on the diffraction areas H1a, H1d are set smaller than the irradiation areas of laser light passing through the light flux areas b1, c1 on the diffraction areas H1b, H1c. Accordingly, the irradiation areas a1, d1 on the sensors P11 through P18 are set smaller than the irradiation areas b1, c1. With this arrangement, it is possible to make the signals PP1L, PP1R shown in FIG. 7B small, and make the signals PP2L, PP2R shown in FIG. 7B large, as compared with the case where the irradiation areas are substantially uniformly distributed on the sensors P11 through P18 as shown in FIG. 5D. Thus, the difference between the signal PP1 and the signal PP2 is reduced, and therefore, it is possible to set the variable k to a small value, as compared with the case where the spectral element H0 is used.

Figure 8C:
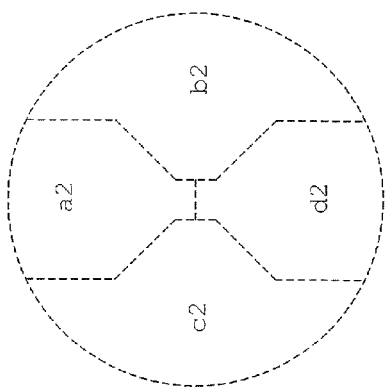
Figure 8D:
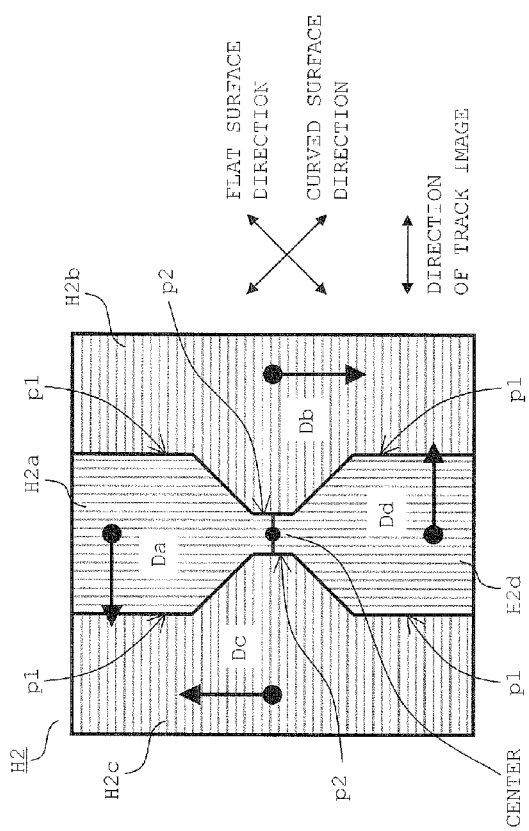

FIG. 8C is a diagram showing an arrangement of the spectral element H2, wherein borderlines near the center of the spectral element H1 are modified. FIG. 8D is a diagram showing four light flux areas a2 through d2 which are divided in such a manner that laser light to be entered into the spectral element H2 corresponds to borderlines between diffraction areas of the spectral element H2.

Referring to FIG. 8C, the light incident surface of the spectral element H2 is divided into four diffraction areas H2a through H2d. In addition to the arrangement of the spectral element H1 shown in FIG. 8A, the borderline between the diffraction areas H2a and H2b of the spectral element H2 further includes a vertically extending straight portion p2 near the center of the spectral element H2. Likewise, the borderline between the diffraction areas H2a, H2c, the borderline between the diffraction areas H2b, H2d, and the borderline between the diffraction areas H2c, H2d each further includes a vertically extending straight portion p2 near the center of the spectral element H2. The two straight portions p2 in proximity to the diffraction area H2b, and the two straight portions p2 in proximity to the diffraction area H2c are symmetrically positioned with respect to the center of the spectral element H2, with the center of the spectral element H2 being interposed therebetween. With this arrangement, there is formed an area only constituted of the diffraction areas H2a, H2d between the straight portions p2 in proximity to the diffraction area H2b and the straight portions p2 in proximity to the diffraction area H2c.

The spectral element H2 is disposed at such a position that the center of the spectral element H2 is aligned with the optical axis of laser light, and laser light passing through the light flux areas a2 through d2 shown in FIG. 8D is respectively entered into the diffraction areas H2a through H2d. In this arrangement, the borderlines of the spectral element H2 are set in such a manner that track images included in the light fluxes to be entered into the spectral element H2 are sufficiently entered into the straight portions p1 of the spectral element H2 in the same manner as the spectral element H1. With this arrangement, the irradiation areas of laser light passing through the light flux areas a2, d2 on the diffraction areas H2a, H2d are set smaller than the irradiation areas of laser light passing through the light flux areas b2, c2 on the diffraction areas H2b, H2c.

FIG. 9B is a schematic diagram showing irradiation areas, on the sensors P11 through P18, of laser light passing through the light flux areas a2 through d2 shown in FIG. 8D, by the spectral element H2 shown in FIG. 8C.

As shown in FIG. 9B, signal light of laser light passing through the light flux areas a2 through d2 is respectively irradiated onto the sensors P11, P12, the sensors P13, P15, the sensors P14, P16, and the sensors P17, P18. In this arrangement, stray light 1, 2 of laser light passing through the light flux areas a2 through d2 is irradiated onto a position on the outside of the signal light area substantially in the same manner as the state shown in FIG. 4B.

In the above arrangement, since the irradiation areas a2, d2 are also set smaller than the irradiation areas b2, c2, it is possible to make the signals PP1L, PP1R shown in FIG. 7B small, and make the signals PP2L, PP2R shown in FIG. 7B large. Thus, the difference between the signal PP1 and the signal PP2 is reduced, and therefore, it is possible to set the variable k to a small value, as compared with the case where the spectral element H0 is used.

In the following, there is described a change in the signal PP1 resulting from shift of an irradiation area on the spectral elements H0, H1, in the case where there is lens shift.

Figure 10A:
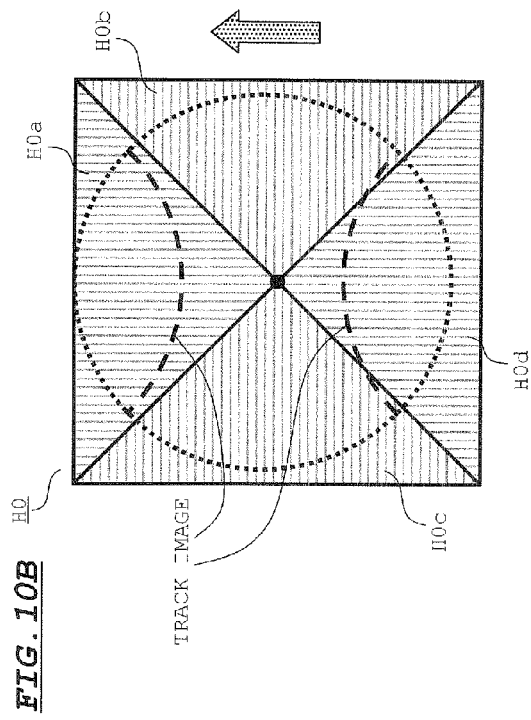
FIGS. 10A through 10D are diagrams for describing a change in signals by lens shift based on the technical principle of the embodiment.
Figure 10B:
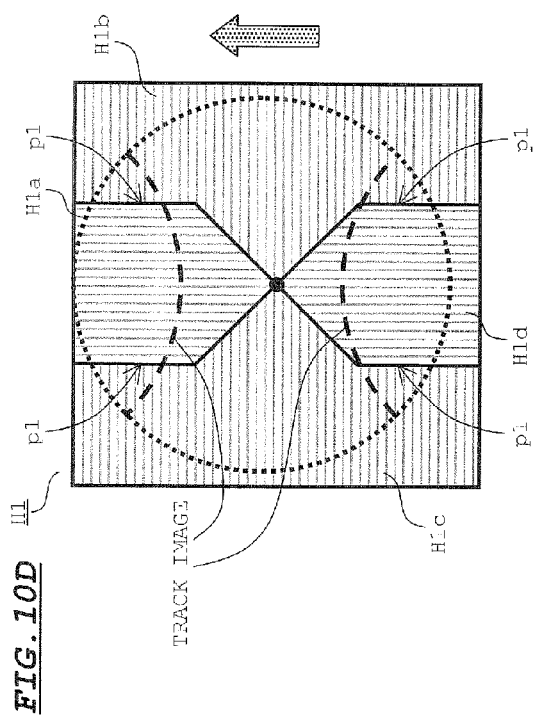
Figure 10C:
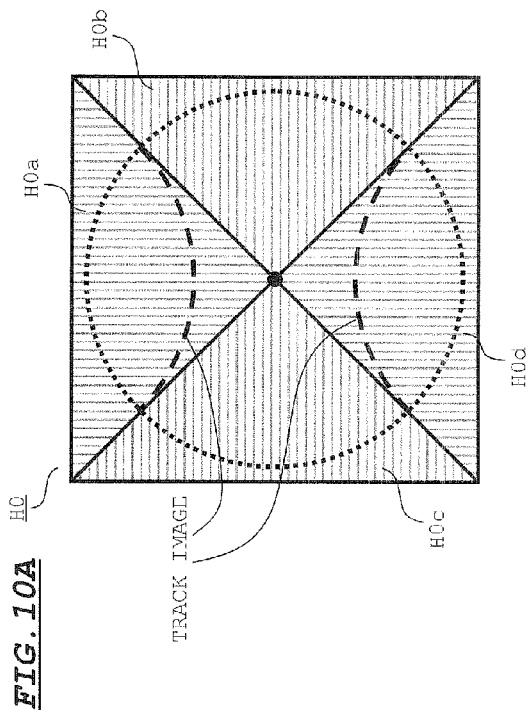
Figure 10D:
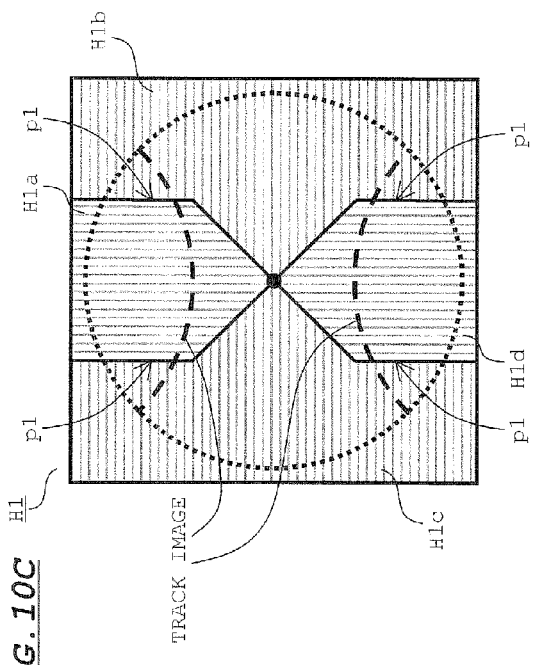

FIGS. 10A, 10C are diagrams respectively showing irradiation areas of light fluxes to be entered into the spectral elements H0, H1 in the case where there is no lens shift. FIGS. 10B, 10D are diagrams respectively showing irradiation areas of light fluxes to be entered into the spectral elements H0, H1 in the case where there is lens shift. FIGS. 10A through 10D also show a track image included in each light flux.

In the case where the spectral element H0 is used, as shown in FIG. 10A, upper and lower track images in the case where there is no lens shift are respectively included in the diffraction areas H0a, H0d. On the other hand, as shown in FIG. 10B, if there is lens shift, the lower track image is deviated from the diffraction area H0d. Thus, if there is lens shift, the amplitude of the signal PP1 by detracking is decreased, as the lens shift is increased. As a result, the amplitude of a push-pull signal PP is also decreased, as the lens shift is increased.

Normally, in tracking servo control, a gain is set for a push-pull signal PP after focus control is performed. The push-pull signal PP is amplified in accordance with the set gain, and the amplified push-pull signal PP is used for tracking servo control. In this arrangement, the gain which is set after focus control is not changed, even if there is lens shift resulting from e.g. a seeking operation. Accordingly, in the case where the amplitude of the push-pull signal PP is decreased by lens shift as described above, the signal after gain adjustment is also decreased, which may make the tracking servo control unstable.

On the other hand, in the case where the spectral element H1 is used, as shown in FIG. 10C, upper and lower track images in the case where there is no lens shift substantially uniformly overlap the diffraction areas H1a, H1d, respectively. Further, as shown in FIG. 10D, even if there is lens shift, upper and lower track images uniformly overlap the diffraction areas H1a, H1d. As described above, even if there is lens shift, the overlapping state of a track image on the diffraction areas H1a, H1d is kept unchanged. Accordingly, even if there is lens shift, the amplitude of the signal PP1 by detracking is kept unchanged. Thus, there is no likelihood that the amplitude of the push-pull signal PP may be changed by lens shift. With the arrangement shown in FIG. 8A, there is no likelihood that the amplitude of the push-pull signal PP may be decreased, even if there is lens shift after a gain for the push-pull signal PP is set following focus control, as described above. Thus, it is possible to stably perform tracking servo control.

As described above, it is possible to suppress lowering the amplitude of the push-pull signal PP even if there is lens shift by allowing track images included in the light fluxes to be entered into the spectral element to be entered into the straight portions p1 formed in the borderlines between the diffraction areas of the spectral element. Thus, it is possible to stably perform tracking servo control.

Next, there is described a change in the signal PP2 resulting from shift of an irradiation area on the spectral elements H0, H2, in the case where there is lens shift.

Figure 11B:
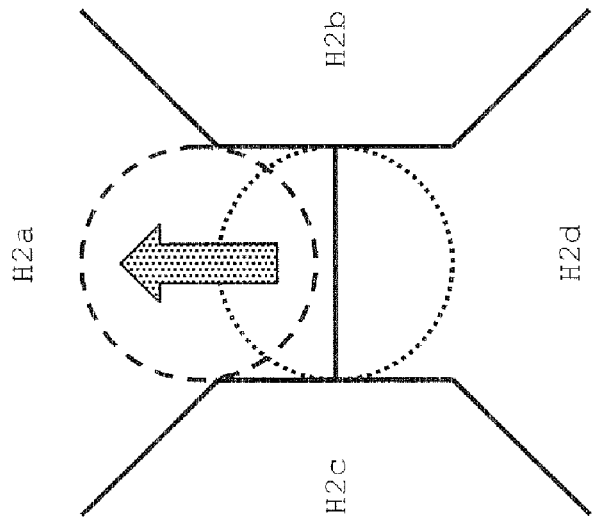
FIGS. 11A and 11B are diagrams for describing a change in signals by lens shift based on the technical principle of the embodiment.
Figure 11A:
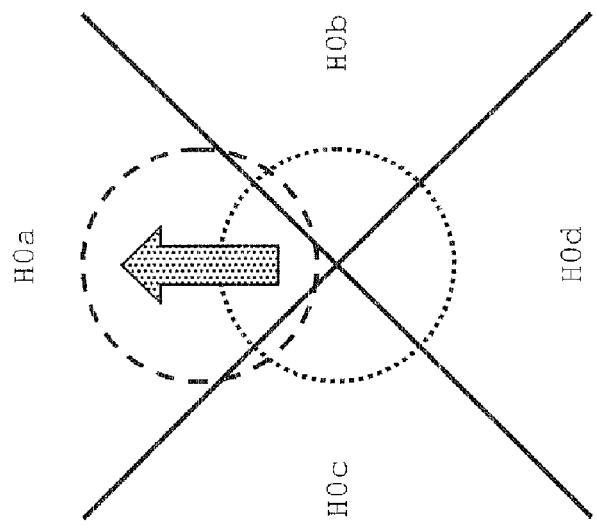

FIGS. 11A, 11B are respectively enlarged views of center portions, on the irradiation areas of light fluxes to be entered into the spectral elements H0, H2, where the light intensity is high. Referring to FIGS. 11A, 11B, the dotted-line circle indicates a center portion where the light intensity is high, in the case where there is no lens shift; and the dashed-line circle indicates a center portion where the light intensity is high, in the case where there is lens shift.

Referring to FIG. 11A, if there is lens shift, a portion of an irradiation area on the spectral element H0, where the light intensity is high, is displaced upward. In this case, since the overlapping area on the diffraction areas H0b, H0c is decreased, the value of the signal PP2 may be greatly changed.

On the other hand, referring to FIG. 11B, if there is lens shift, a portion of an irradiation area on the spectral element H2, where the light intensity is high, is displaced upward. In this case, the value of the signal PP2 is not greatly changed, because there is no overlapping between a portion of an irradiation area where the light intensity is high, and the diffraction areas H2b, H2c, both in the case where there is lens shift and in the case where there is no lens shift. Accordingly, it is possible to more linearly change the value of the signal PP2 by lens shift, as compared with the state shown in FIG. 11A.

In the above arrangement, the value of the signal PP1 is substantially linearly changed by lens shift. Accordingly, it is possible to more effectively suppress an offset (a DC component) included in the signal PP1 by using the value of the signal PP2 which is linearly changed. Thus, it is possible to more effectively suppress an offset (a DC component) of the push-pull signal PP by setting an area which is interposed between the straight portions p2, at a position near the center of the diffraction areas of the spectral element.

Next, the spectral elements H3 through H5 as variation examples are described, wherein the borderlines between the diffraction areas of the spectral element H2 are modified.

Figure 12B:
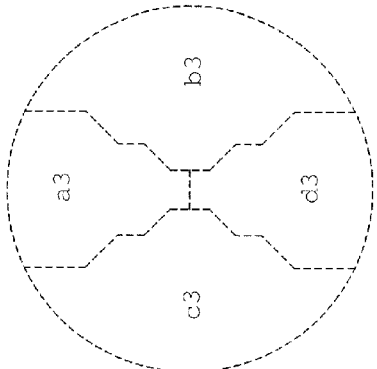
FIGS. 12A through 12D are diagrams showing a modification example of the spectral element based on the technical principle of the embodiment.
Figure 12D:
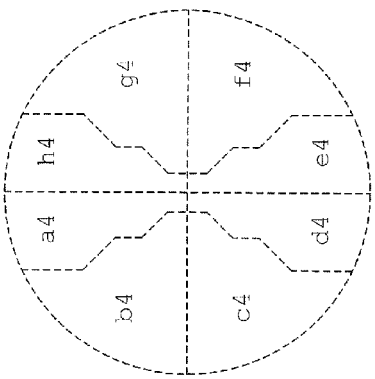
Figure 12A:
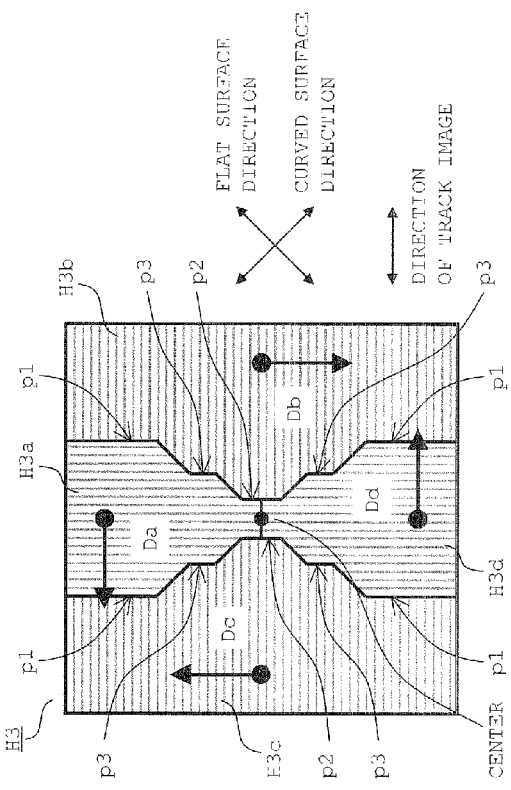

FIG. 12A is a diagram showing an arrangement of the spectral element H3. FIG. 12B is a diagram showing four light flux areas a3 through d3 which are divided in such a manner that laser light to be entered into the spectral element H3 corresponds to borderlines between diffraction areas of the spectral element H3.

Referring to FIG. 12A, the light incident surface of the spectral element H3 is divided into four diffraction areas H3a through H3d. In addition to the arrangement of the spectral element H2 in FIG. 8C, the borderline between the diffraction area H3a and the diffraction area H3b of the spectral element H3 further includes a vertically extending straight portion p3 between a portion near the center of the spectral element H3 and a portion near the outer periphery of the spectral element H3. Likewise, the borderline between the diffraction areas H3a, H3c, the borderline between the diffraction areas H3b, H3d, and the borderline between the diffraction areas H3c, H3d each further includes a vertically extending straight portion p3 between a portion near the center of the spectral element H3 and a portion near the outer periphery of the spectral element H3.

Further, the spectral element H3 is disposed at such a position that the center of the spectral element H3 is aligned with the optical axis of laser light, and laser light passing through the light flux areas a3 through d3 shown in FIG. 12B is respectively entered into the diffraction areas H3a through H3d. In this arrangement, the borderlines of the spectral element H3 are set in such a manner that track images included in the light fluxes to be entered into the spectral element H3 are sufficiently entered into the straight portions p1 of the spectral element H3 in the same manner as in the spectral element H2.

FIG. 14A is a schematic diagram showing irradiation areas, on the sensors P11 through p18, of laser light passing through the light flux areas a3 through d3 shown in FIG. 12B, by the spectral element H3 shown in FIG. 12A.

As shown in FIG. 14A, signal light of laser light passing through the light flux areas a3 through d3 is respectively irradiated onto the sensors P11, P12, the sensors P13, P15, the sensors P14, P16, and the sensors P17, P18. In this arrangement, stray light 1, 2 of laser light passing through the light flux areas a3 through d3 is irradiated onto a position on the outside of the signal light area substantially in the same manner as the state shown in FIG. 4B.

With use of the spectral element H3 having the borderlines as defined above, it is possible to more linearly change the value of the signal PP2 by lens shift, as compared with the case where the spectral element H2 is used, because plural vertically extending straight portions are formed on the borderlines. Specifically, since a change in the irradiation areas on the diffraction areas H3b, H3c by lens shift is further reduced, as compared with the case where the spectral element H2 is used, it is possible to more linearly change the value of the signal PP2 by lens shift, and therefore, it is possible to more effectively suppress an offset (a DC component) of the push-pull signal PP by lens shift.

Figure 12C:
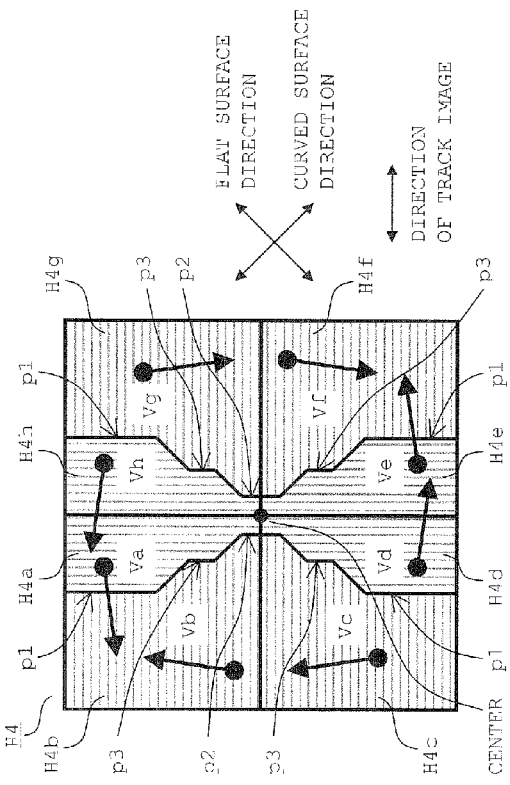
Figure 15A:
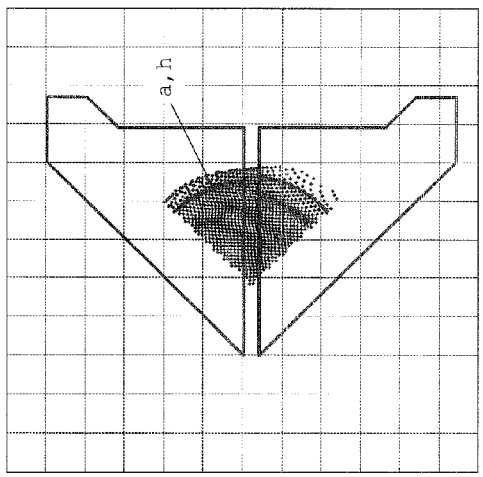
FIGS. 15A through 15D are diagrams showing a simulation result on irradiation areas based on the technical principle of the embodiment.
Figure 15B:
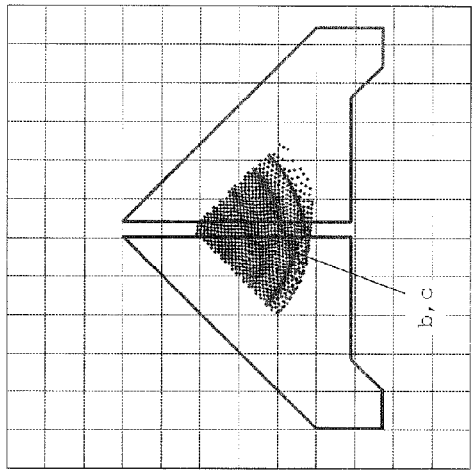
Figure 15C:
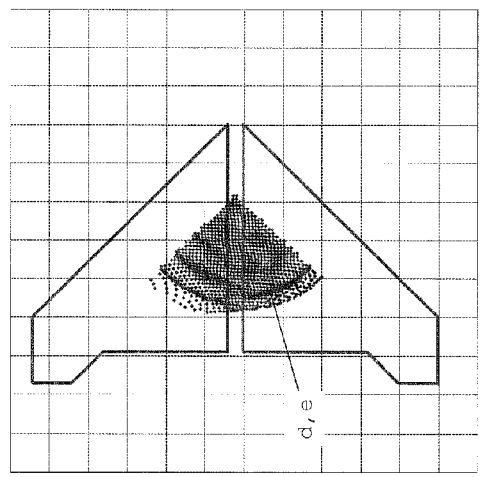
Figure 15D:
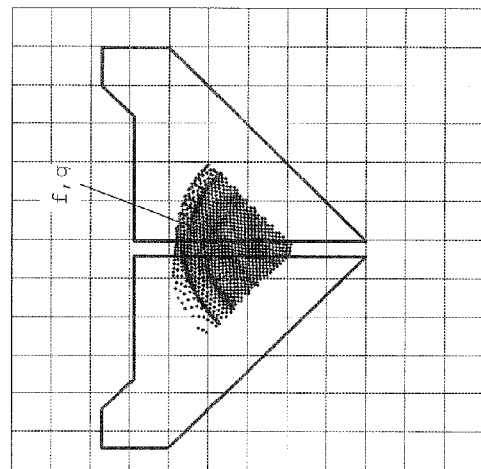

FIG. 12C is a diagram showing the spectral element H4, wherein the diffraction areas of the spectral element H3 are further divided by a vertically extending straight line and a horizontally extending straight line which pass through the center of the spectral element. FIG. 12D is a diagram showing eight light flux areas a4 through h4 which are divided in such a manner that laser light to be entered into the spectral element H4 corresponds to borderlines between diffraction areas of the spectral element H4.

Referring to FIG. 12C, the light incident surface of the spectral element H4 is divided into eight diffraction areas H4a through H4d. The diffraction areas H4a through H4h respectively diffract the entered laser light in directions Va through Vh by diffraction of the diffraction areas H4a through H4h. Each of the directions Va, Vh is slightly displaced from the direction Da shown in FIG. 4A by a component in downward direction and by a component in upward direction. Each of the directions Vf, Vg is slightly displaced from the direction Db shown in FIG. 4A by a component in leftward direction and by a component in rightward direction. Each of the directions Vb, Vc is slightly displaced from the direction Dc shown in FIG. 4A by a component in rightward direction and by a component in leftward direction. Each of the directions Vd, Ve is slightly displaced from the direction Dd shown in FIG. 4A by a component in downward direction and by a component in upward direction.

FIG. 14B is a schematic diagram showing irradiation areas, on the sensors P11 through P18, of laser light passing through the light flux areas a4 through h4 shown in FIG. 12D, by the spectral element H4 shown in FIG. 12C.

As shown in FIG. 14B, signal light of laser light passing through the light flux areas a4 through d4 is respectively irradiated onto the sensors P11, P12, the sensors P13, P15, the sensors P14, P16, and the sensors P17, P18. In this arrangement, stray light 1, 2 of laser light passing through the light flux areas a4 through h4 is irradiated onto a position on the outside of the signal light area substantially in the same manner as the state shown in FIG. 4B.

Further, as shown in FIG. 14B, the irradiation areas a4, h4 are disposed away from each other with respect to a clearance formed in the boundary portion between the sensors P11, P12. Specifically, the clearance between the irradiation areas a4, h4 is set larger than the clearance formed in the boundary portion between the sensors P11, P12. Likewise, the irradiation areas b4, c4 are disposed away from each other with respect to a clearance formed in the boundary portion between the sensors P14, P16; the irradiation areas f4, g4 are disposed away from each other with respect to a clearance formed in the boundary portion between the sensors P13, 15; and the irradiation areas d4, e4 are disposed away from each other with respect to a clearance formed in the boundary portion between the sensors P17, 18. Specifically, the clearance between the irradiation areas b4, c4 is set larger than the clearance formed in the boundary portion between the sensors P14, P16; the clearance between the irradiation areas f4, g4 is set larger than the clearance formed in the boundary portion between the sensors P13, P15; and the clearance between the irradiation areas d4, e4 is set larger than the clearance formed in the boundary portion between the sensors P17, P18. With this arrangement, it is possible to suppress lowering the precision of output signals from the sensors P11 through P18 resulting from positional displacement, even in the case where the positions of the sensors P11 through P18 are displaced in upward/downward directions and leftward/rightward directions within the plane S0 (see FIG. 1A).

FIG. 13A is a diagram showing the spectral element H5, wherein a lens function is given to the spectral element H4. FIG. 13B is a diagram showing eight light flux areas a5 through h5 which are divided in such a manner that laser light to be entered into the spectral element H5 corresponds to borderlines between diffraction areas of the spectral element H5.

Referring to FIG. 13A, the light incident surface of the spectral element H5 is divided into eight diffraction areas H5a through H5d, in the same manner as the spectral element H4. Unlike the spectral element H4, the diffraction areas H5a through H5h have a lens function. Specifically, the phase function representing the diffraction of the diffraction areas H5a through H5h of the spectral element H5 has a square term.

FIG. 14C is a schematic diagram showing irradiation areas, on the sensors P11 through P18, of laser light passing through the light flux areas a5 through h5 shown in FIG. 13B, by the spectral element H5 shown in FIG. 13A.

As shown in FIG. 14C, signal light of laser light passing through the light flux areas a5 through h5 is respectively irradiated onto the sensors P11, P12, the sensors P13, P15, the sensors P14, P16, and the sensors P17, P18. In this arrangement, stray light 1, 2 of laser light passing through the light flux areas a5 through h5 is irradiated onto a position on the outside of the signal light area substantially in the same manner as the state shown in FIG. 4B.

Further, as shown in FIG. 14C, ends of the two irradiation areas positioned at four vertices of the signal light area, which are on the near side of the corresponding vertex of the signal light area, are set close to each other. Specifically, in FIG. 14C, ends of the two irradiation areas positioned at four vertices of the signal light area, which are on the near side of the corresponding vertex of the signal light area, are set close to each other, as compared with the state shown in FIG. 14B. As a result, it may be difficult to suppress lowering the precision of output signals from the sensors P11 through P18 resulting from positional displacement, in the case where the positions of the sensors P11 through P18 are displaced within the plane S0 (see FIG. 1A), as compared with the case where the spectral element H4 is used. However, the output signal from each sensor is changed depending on displacement of the sensors P11 through P18 within the plane S0. Accordingly, it is possible to adjust the positions of the sensors P11 through P18 within the plane S0 by referring to the output signals from the sensors P11 through P18 e.g. at the time of assembling an optical pickup device, thereby properly disposing the sensors P11 through P18.

Next, a simulation result on irradiation areas on the sensor layout is described, in the case where the spectral elements H0, H5 are used, referring to FIGS. 15A through 15D, and FIGS. 16A through 16D.

FIGS. 15A through 15D are respectively enlarged views of a left portion, an upper portion, a right portion, and a lower portion of the sensor layout, showing the irradiation areas of signal light on the light receiving surface in the case where the spectral element H0 is used. The irradiation areas a through h of signal light in the case where the spectral element H0 is used are positioned on the respective sensors in the same manner as the state shown in FIG. 5D.

FIGS. 16A through 16D are respectively enlarged views of a left portion, an upper portion, a right portion, and a lower portion of the sensor layout, showing the irradiation areas of signal light on the light receiving surface in the case where the spectral element H5 is used. The irradiation areas a5 through h5 of signal light in the case where the spectral element H5 is used are positioned on the respective sensors in the same manner as the state shown in FIG. 14C.

As described above, it is clear that with use of the spectral element H5, the irradiation areas on the sensors (the sensors shown in FIGS. 16A, 16C) corresponding to the signals PP1L, PP1R are reduced, as compared with the irradiation areas on the sensors (the sensors shown in FIGS. 16B, 16D) corresponding to the signals PP2L, PP2R.

Figure 16A:
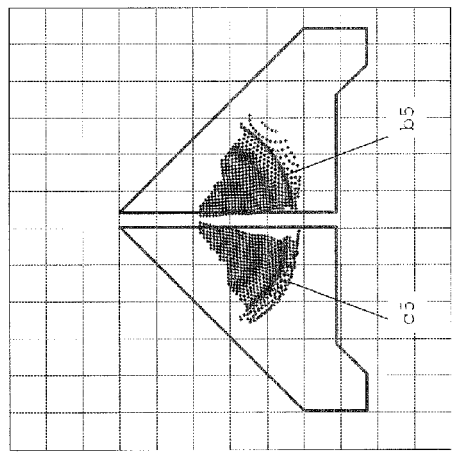
FIGS. 16A through 16D are diagram showing a simulation result on irradiation areas based on the technical principle of the embodiment.
Figure 16B:
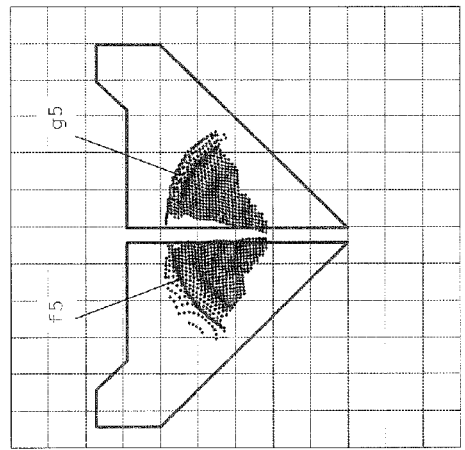
Figure 16C:
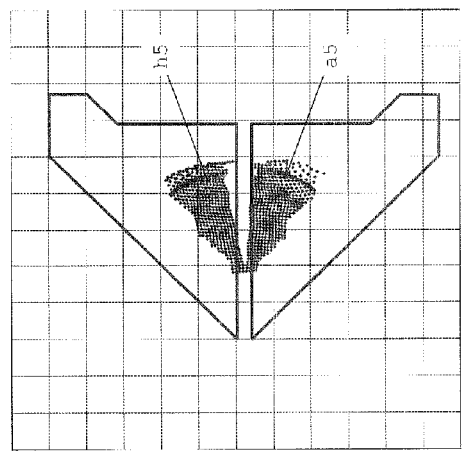
Figure 16D:
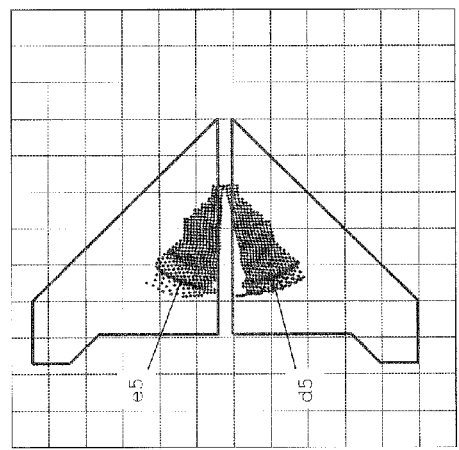

Further, in FIG. 16A, left ends of the irradiation areas a5, h5 are disposed close to each other to be included in the clearance between the sensors, and right ends of the irradiation areas a5, h5 are disposed away from each other not to be included in the clearance between the sensors. Likewise, in FIGS. 16B through 16D, each pair of irradiation areas is set such that one ends of each irradiation area pair are disposed close to each other to be included in the clearance between the sensors, and other ends of each irradiation area pair are disposed away from each other not to be included in the clearance between the sensors. With this arrangement, even if the positions of the sensors are displaced, it is possible to suppress lowering the precision of output signals from the sensors, as compared with the case where the spectral element H0 is used. Further, it is possible to adjust the positions of the sensors by referring to output signals from the sensors.

Figure 17A:
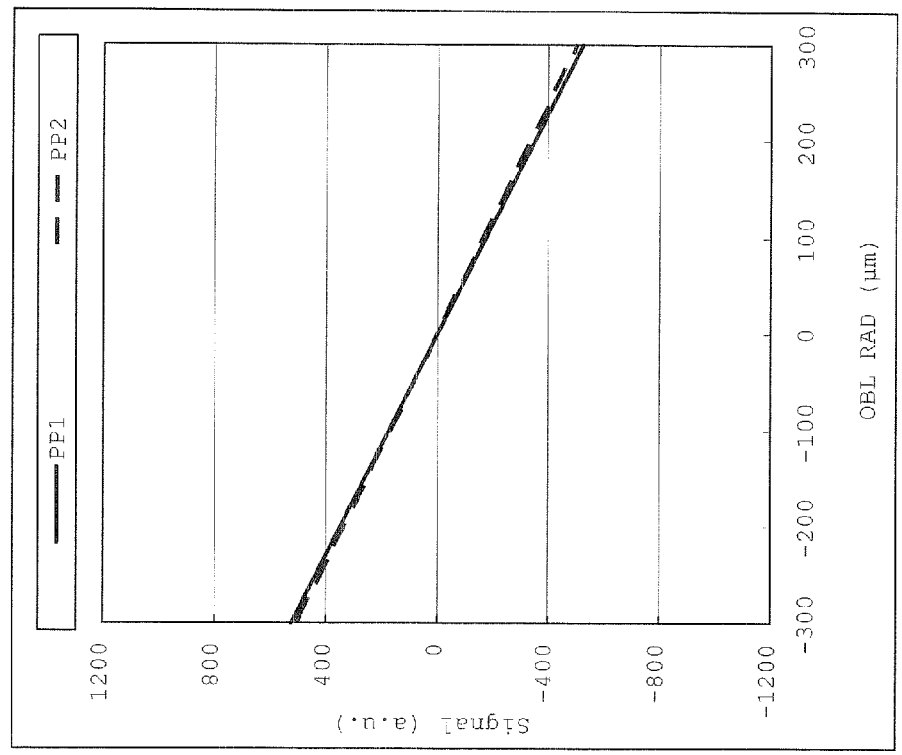
FIGS. 17A and 17B are diagrams showing a simulation result on an offset (a DC component) of a signal by lens shift based on the technical principle of the embodiment.
Figure 17B:
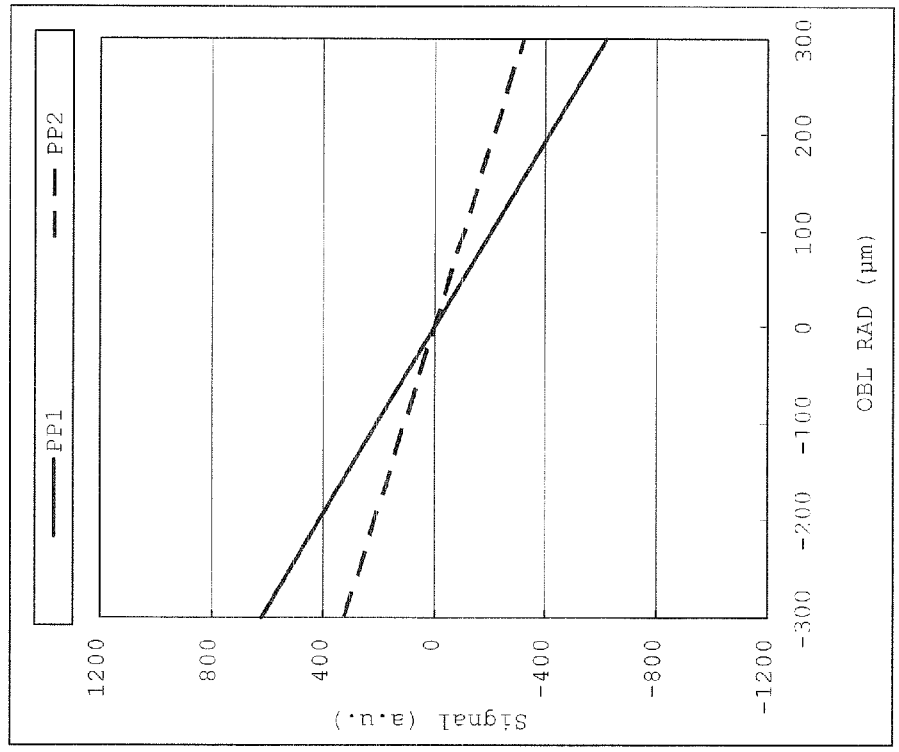

FIGS. 17A, 17B are diagram showing a simulation result on an offset (a DC component) of the signals PP1, PP2 by lens shift, in the case where the spectral elements H0, H5 are used. FIGS. 17A, 17B are diagrams respectively showing a case where the spectral element H0 is used, and a case where the spectral element H5 is used.

In the case where the spectral element H5 is used, as described above, the irradiation areas on the sensors corresponding to the signals PP1L, PP1R are set small, and the irradiation areas on the sensors corresponding to the signals PP2L, PP2R are set large, as compared with the case where the spectral element H0 is used. As a result, the gradient of the signal PP1 shown in FIG. 17B is set smaller than the gradient of the signal PP1 shown in FIG. 17A; and the gradient of the signal PP2 shown in FIG. 17B is set larger than the gradient of the signal PP2 shown in FIG. 17A. With this arrangement, since the gradients of the signals PP1, PP2 shown in FIG. 17B are set close to each other, it is possible to set the value of the variable k which is multiplied to the signal PP2 to a small value in order to suppress an offset (a DC component) of the signal PP1 shown in FIG. 17B, as compared with the state shown in FIG. 17A.

In the simulation result shown in FIG. 17B, the gradients of the signals PP1, PP2 are substantially equal to each other. Accordingly, the variable k is set to: k≈1. In this case, even if noise is included in the signal PP2 by slight incidence of stray light into a sensor, there is no likelihood that the noise may be amplified by multiplication with the variable k. Thus, it is possible to suppress an influence of noise on the push-pull signal PP.

In the following example, a concrete construction example of an optical pickup device using the spectral element H5 is described.

Example

The inventive example is an example, wherein the invention is applied to an optical pickup device compatible with BD, DVD and CD. The above principle is applied only to an optical system for BD, and a focus adjusting technology by a conventional astigmatism method and a tracking adjusting technology by a 3-beam system (an in-line system) are applied to an optical system for CD and an optical system for DVD.

Figure 18B:
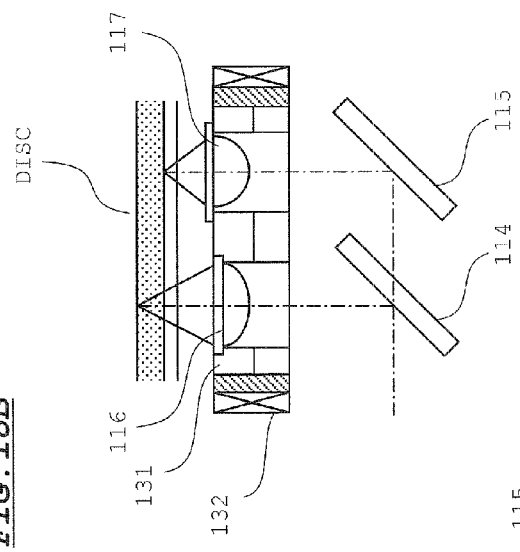
FIGS. 18A through 18C are diagrams showing an optical system of an optical pickup device in an inventive example.
Figure 18C:
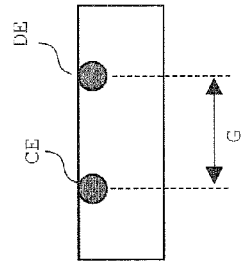
Figure 18A:
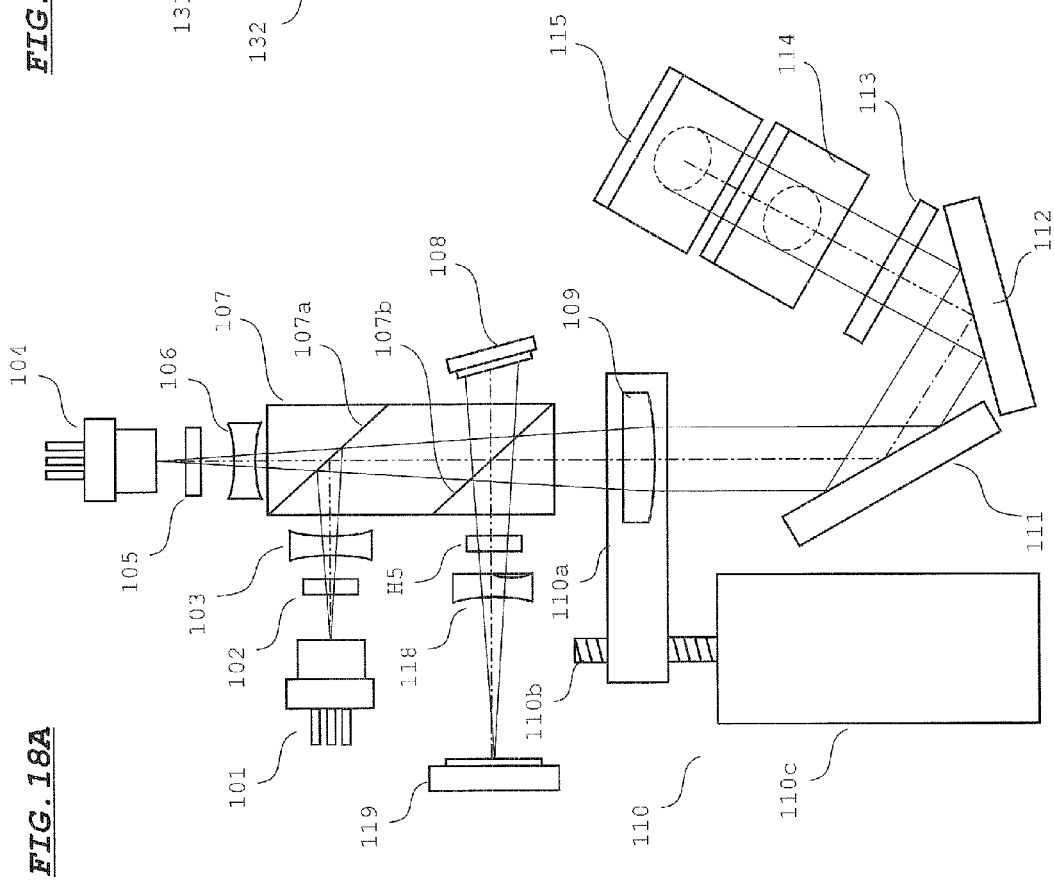

FIGS. 18A and 18B are diagrams showing an optical system of an optical pickup device in the inventive example. FIG. 18A is a plan view of the optical system showing a state that elements of the optical system on the disc side with respect to rise-up mirrors 114, 115 are omitted, and FIG. 18B is a perspective side view of the optical system posterior to the rise-up mirrors 114, 115.

As shown in FIG. 18A, the optical pickup device is provided with a semiconductor laser 101, a half wave plate 102, a diverging lens 103, a dual wavelength laser 104, a diffraction grating 105, a diverging lens 106, a complex prism 107, a front monitor 108, a collimator lens 109, a driving mechanism 110, reflection mirrors 111, 112, a quarter wave plate 113, the rise-up mirrors 114, 115, a dual wavelength objective lens 116, a BD objective lens 117, a spectral element H5, an anamorphic lens 118, and a photodetector 119.

The semiconductor laser 101 emits laser light (hereinafter, called as "BD light") for BD and having a wavelength of or about 405 nm. The half wave plate 102 adjusts the polarization direction of BD light. The diverging lens 103 adjusts the focal length of BD light to shorten the distance between the semiconductor laser 101 and the complex prism 107.

The dual wavelength laser 104 accommodates, in a certain CAN, two laser elements which each emit laser light (hereinafter, called as "CD light") for CD and having a wavelength of or about 785 nm, and laser light (hereinafter, called as "DVD light") for DVD and having a wavelength of or about 660 nm.

FIG. 18C is a diagram showing an arrangement pattern of laser elements (laser light sources) in the dual wavelength laser 104. FIG. 18C is a diagram of the dual wavelength laser 104 when viewed from the beam emission side. In FIGS. 18C, CE and DE respectively indicate emission points of CD light and DVD light. The gap between the emission points of CD light and DVD light is represented by the symbol G.

As will be described later, the gap G between the emission point CE of CD light and the emission point DE of DVD light is set to such a value as to properly irradiate DVD light onto a four-divided sensor for DVD light. Accommodating two light sources in one CAN as described above enables to simplify the optical system, as compared with an arrangement provided with plural CANs.

Referring back to FIG. 18A, the diffraction grating 105 separates each of CD light and DVD light into a main beam and two sub beams. The diffraction grating 105 is a two-step diffraction grating. Further, the diffraction grating 105 is integrally formed with a half wave plate. The half wave plate integrally formed with the diffraction grating 105 adjusts the polarization directions of CD light and DVD light. The diverging prism 106 adjusts the focal lengths of CD light and DVD light to shorten the distance between the dual wavelength laser 104 and the complex prism 107.

The complex prism 107 is internally formed with a dichroic surface 107a, and a Polarizing Beam Splitter (PBS) surface 107b. The dichroic surface 107a reflects BD light, and transmits CD light and DVD light. The semiconductor laser 101, the dual wavelength laser 104 and the complex prism 107 are disposed at such positions that the optical axis of BD light reflected on the dichroic surface 107a and the optical axis of CD light transmitted through the dichroic surface 107a are aligned with each other. The optical axis of DVD light transmitted through the dichroic surface 107a is displaced from the optical axes of BD light and CD light by the gap G shown in FIG. 18C.

A part of each of BD light, CD light and DVD light is reflected on the PBS surface 107b, and a main part thereof is transmitted through the PBS surface 107b. As described above, the half wave plate 102, and the diffraction grating 105 (and the half wave plate integrally formed with the diffraction grating 105) are disposed at such positions that a part of each of BD light, CD light and DVD light is reflected on the PBS surface 107b.

When the diffraction grating 105 is disposed at the position as described above, a main beam and two sub beams of CD light, and a main beam and two sub beams of DVD light are respectively aligned along the tracks of CD and DVD. The main beam and the two sub beams reflected on CD are irradiated onto four-divided sensors for CD on the photodetector 120, which will be described later. The main beam and two sub beams reflected on DVD are irradiated onto four-divided sensors for DVD on the photodetector 120, which will be described later.

BD light, CD light, DVD light reflected on the PBS surface 107b is irradiated onto the front monitor 108. The front monitor 108 outputs a signal in accordance with a received light amount. The signal from the front monitor 108 is used for emission power control of the semiconductor laser 101 and the dual wavelength laser 104.

The collimator lens 109 converts BD light, CD light and DVD light entered from the side of the complex prism 107 into parallel light. The driving mechanism 110 moves the collimator lens 109 in the optical axis direction in accordance with a control signal for aberration correction. The driving mechanism 110 is provided with a holder 110a for holding the collimator lens 109, and a gear 110b for feeding the holder 110a in the optical axis direction of the collimator lens 109. The gear 110b is interconnected to a driving shaft of a motor 110c.

BD light, CD light and DVD light collimated by the collimator lens 109 are reflected on the two reflection mirrors 111, 112, and are entered into the quarter wave plate 113. The quarter wave plate 113 converts BD light, CD light and DVD light entered from the side of the reflection mirror 112 into circularly polarized light, and converts BD light, CD light and DVD light entered from the side of the rise-up mirror 114 into a linearly polarized light whose polarization direction is orthogonal to the polarization direction upon incidence from the side of the reflection mirror 112. With this operation, light reflected on a disc is reflected on the PBS surface 107b.

The rise-up mirror 114 is a dichroic mirror. The rise-up mirror 114 transmits BD light, and reflects CD light and DVD light in a direction toward the dual wavelength objective lens 116. The rise-up mirror 115 reflects BD light in a direction toward the BD objective lens 117.

The dual wavelength objective lens 116 is configured to properly focus CD light and DVD light on CD and DVD, respectively. Further, the BD objective lens 117 is configured to properly focus BD light on BD. The dual wavelength objective lens 116 and the BD objective lens 117 are driven by an objective lens actuator 132 in a focus direction and in a tracking direction, while being held on the holder 131.

The spectral element H5 is the spectral element shown in FIG. 13A. Out of BD light, CD light and DVD light entered into the spectral element H5, BD light is divided into eight light fluxes, and the propagating direction of each light flux is changed by diffraction of the spectral element H5. Main parts of CD light and DVD light are transmitted through the spectral element H5 without undergoing diffraction by the spectral element H5.

The spectral element H5 is made of a square transparent plate, and has a stepped diffraction pattern (a diffraction hologram) on a light incident surface thereof. The step number and the step height of the diffraction pattern are set such that plus first order diffraction efficiency with respect to the wavelength of BD light is set high, and that zero-th order diffraction efficiency with respect to the wavelengths of CD light and DVD light is set high. The diffraction angle is adjusted by the pitch of a diffraction pattern.

The diffraction areas H5a through H5h of the spectral element H5 are formed by e.g. a diffraction pattern having eight steps. In this case, the step difference per step is set to 7.35 μm. With this arrangement, it is possible to set the diffraction efficiencies of zero-th order diffraction light of CD light and DVD light to 99% and 92% respectively, while keeping the diffraction efficiency of plus first order diffraction light of BD light to 81%. In this case, zero-th order diffraction efficiency of BD light is set to 7%. CD light and DVD light are irradiated onto four-divided sensors of the photodetector 119, which will be described later, substantially without undergoing diffraction by the diffraction areas H5a through H5h.

Alternatively, it is possible to set the number of steps of a diffraction pattern to be formed in the diffraction areas H5a through H5h to the number other than eight. Furthermore, it is possible to configure the diffraction areas H5a through H5h by using e.g. the technology disclosed in Japanese Unexamined Patent Publication No. 2006-73042. Using the above technology enables to more finely adjust diffraction efficiencies of BD light, CD light and DVD light.

The anamorphic lens 118 imparts astigmatism to BD light, CD light and DVD light entered from the side of the spectral element H5. The anamorphic lens 118 corresponds to the anamorphic lens shown in FIGS. 1A, 1B. BD light, CD light and DVD light transmitted through the anamorphic lens 118 are entered into the photodetector 119. The photodetector 119 has a sensor layout for receiving each of the light.

Figure 19:
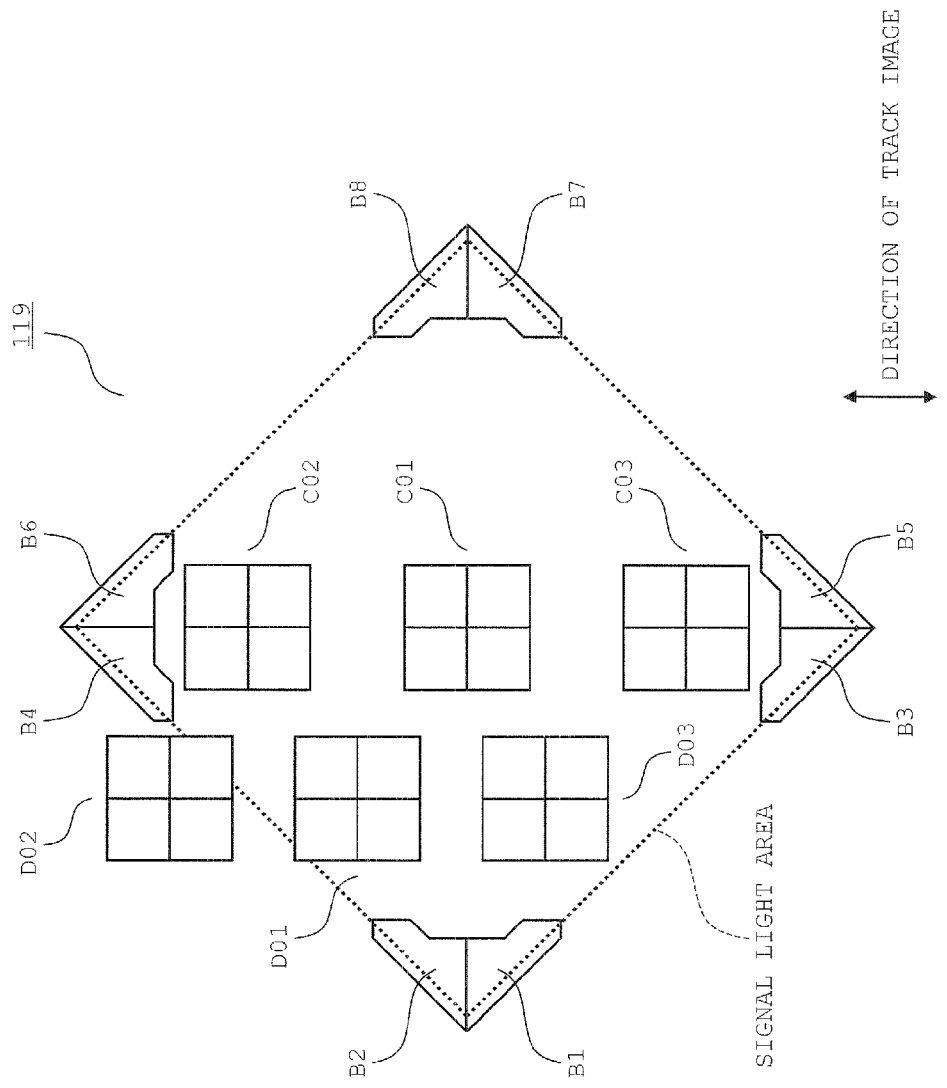
FIG. 19 is a diagram showing a sensor layout of a photodetector in the inventive example.

FIG. 19 is a diagram showing a sensor layout of the photodetector 119.

The photodetector 119 has sensors B1 through B8 for BD and for receiving BD light separated by the spectral element H5; four-divided sensors C01 through C03 for CD and for receiving CD light transmitted through the spectral element H5 without separation by the spectral element H5; and four-divided sensors D01 through D03 for DVD and for receiving DVD light transmitted through the spectral element H5 without separation by the spectral element H5. Signal light of BD light separated by the spectral element H5 is respectively irradiated onto vertex portions of the signal light area.

As shown in FIG. 19, the sensors B1, B2, the sensors B3, B5, the sensors B4, B6, the sensors B7, B8 are disposed near the four vertices of the signal light area to receive signal light of BD light passing through the light flux areas a through h, respectively. The sensors B1 through B8 are disposed at such positions that the irradiation area of BD light which is positioned on the inside of the four vertex portions of the signal light area is sufficiently included. With this arrangement, it is possible to sufficiently receive signal light separated by the spectral element H5 by the sensors B1 through B8, even in the case where the positions of the sensors B1 through B8 are displaced resulting from e.g. aging deterioration. The irradiation areas of signal light of BD light on the sensors B1 through B8 are substantially the same as the irradiation areas on the sensors P11 through P18 shown in FIG. 14C.

The optical axes of BD light and CD light are aligned with each other on the dichroic surface 107a as described above. Accordingly, a main beam (zero-th order diffraction light) of CD light is irradiated onto a center of the signal light area of BD light, on the light receiving surface of the photodetector 119. The four-divided sensor C01 is disposed at the center position of a main beam of CD light. The four-divided sensors C02, C03 are disposed in the direction of a track image with respect to a main beam of CD light, on the light receiving surface of the photodetector 119, to receive sub beams of CD light.

Since the optical axis of DVD light is displaced from the optical axis of CD light as described above, a main beam and two sub beams of DVD light are irradiated at positions displaced from the irradiation positions of a main beam and two sub beams of CD light, on the light receiving surface of the photodetector 119. The four-divided sensors D01 through D03 are respectively disposed at the irradiation positions of a main beam and two sub beams of DVD light. The distance between a main beam of CD light and a main beam of DVD light is determined by the gap G between emission points of CD light and DVD light shown in FIG. 18C.

As described above, according to the inventive example, as shown in FIG. 14C, the irradiation area of signal light of BD light is distributed on the inside of the four vertex portions of the signal light area, and the irradiation areas of stray light 1, 2 of BD light are distributed on the outside of the signal light area substantially in the same manner as the state shown in FIG. 4B. Accordingly, it is possible to receive only signal light of BD light by the sensors B1 through B8 shown in FIG. 19. Thus, it is possible to suppress degradation of a detection signal resulting from stray light.

According to the inventive example, in the case where an offset (a DC component) of a push-pull signal PP by lens shift is suppressed, as shown in FIG. 7B, it is possible to set the value of the variable k to a small value. With this arrangement, even in the case where noise such as stray light is included in the signal PP2, it is possible to suppress an influence of noise on the push-pull signal PP, because there is no likelihood that the signal PP2 may be multiplied with a variable k of a large value. Thus, it is possible to keep the precision of the push-pull signal PP high.

According to the inventive example, each of the borderline between the diffraction areas H5a, H5b, the borderline between the diffraction areas H5c, H5d, the borderline between the diffraction areas H5e, H5f, and the borderline between the diffraction areas H5g, H5h includes a vertically extending straight portion p1 near the outer periphery of the spectral element H5. It is possible to suppress lowering the amplitude of the push-pull signal PP even if there is lens shift, by allowing track images included in the light fluxes to be entered into the spectral element H5 to be entered into the straight portions p1. Thus, it is possible to stably perform tracking servo control.

According to the inventive example, each of the borderline between the diffraction areas H5a, H5b, the borderline between the diffraction areas H5c, H5d, the borderline between the diffraction areas H5e, H5f, and the borderline between the diffraction areas H5g, H5h includes a vertically extending straight portion p2 near the center of the spectral element H5. With this arrangement, since there is no likelihood that a portion of an irradiation area where the light intensity is high may overlap the diffraction areas H5b, H5c, H5f, H5g, irrespective of presence or absence of lens shift, it is possible to suppress a change in the value of the signal PP2. Thus, the value of the signal PP2 by lens shift is more linearly changed, and therefore, it is possible to more effectively suppress an offset (a DC component) of a push-pull signal PP.

According to the inventive example, each of the borderline between the diffraction areas H5a, H5b, the borderline between the diffraction areas H5c, H5d, the borderline between the diffraction areas H5e, H5f, and the borderline between the diffraction areas H5g, H5h further includes a vertically extending straight portion p3 between a portion near the center of the spectral element H5 and a portion near the outer periphery of the spectral element H5. With this arrangement, since the value of the signal PP2 is more linearly changed, it is possible to more effectively suppress an offset (a DC component) of a push-pull signal PP.

According to the inventive example, as shown in FIG. 14C and FIGS. 16A through 16D, inner portions of the two irradiation areas which are distributed at the corresponding four vertex portions of the signal light area are disposed away from each other, with a clearance being formed between the corresponding two sensors. With this arrangement, even if the positions of the sensors B1 through B8 are displaced, output signals from the sensors B1 through B8 are less likely to be degraded. Further, outer portions of the two irradiation areas which are distributed at the corresponding four vertex portions of the signal light area are disposed close to each other, with a clearance being formed between the corresponding two sensors. With this arrangement, it is possible to adjust the positions of the sensors B1 through B8 within the plane S0, by referring to the output signals from the sensors B1 through B8, thereby properly disposing the sensors B1 through B8.

The example of the invention has been described as above. The invention is not limited to the foregoing example, and the example of the invention may be modified in various ways other than the above.

For instance, in the inventive example, BD light is separated by using the spectral element H5 having a diffraction pattern on a light incident surface thereof. Alternatively, BD light may be separated by using a spectral element constituted of a multifaceted prism, in place of using the spectral element H5. Eight surfaces corresponding to the diffraction areas H5a through H5h of the spectral element H5 are formed on a light incident surface of the multifaceted prism. Light to be entered into the eight surfaces are refracted in the directions Va through Vh shown in FIG. 13A. With this arrangement, signal light of BD light is irradiated onto the light receiving surface as shown in FIG. 14C in the same manner as the case where the spectral element H5 is used.

In the case where a spectral element constituted of a multifaceted prism is used, the optical system for receiving BD light, and the optical system for receiving CD light and DVD light may be individually constructed. Specifically, BD light is guided to the BD objective lens 117 shown in FIG. 18B by the optical system for BD, and CD light and DVD light are guided to the dual wavelength objective lens 116 by the optical system for CD/DVD which is constructed independently of the optical system for BD. The optical system for BD has a laser light source for emitting BD light, and one photodetector for receiving BD light reflected on BD. The optical system for CD/DVD has a laser light source for emitting CD light and DVD light, and a photodetector other than the photodetector for BD light and for receiving CD light, DVD light reflected on CD, DVD. The photodetector for CD/DVD has two sensor groups for individually receiving CD light and DVD light. Similarly to the inventive example, the optical system for BD is provided with an anamorphic lens for imparting astigmatism to BD light reflected on BD. The spectral element constituted of a multifaceted prism is disposed anterior to the anamorphic lens.

Furthermore, in the inventive example, the spectral element H5 is disposed anterior to the anamorphic lens 118. Alternatively, the spectral element H5 may be disposed posterior to the anamorphic lens 118, or a diffraction pattern for imparting the same diffraction function as the spectral element H5 to laser light may be integrally formed on an incident surface or an output surface of the anamorphic lens 118.

Further, in the inventive example, as shown in FIG. 14C, the spectral element H5 has a lens function such that inner portions of the two irradiation areas which are distributed at the corresponding four vertex portions of the signal light area are disposed away from each other. Alternatively, the spectral element H5 may have a lens function such that outer portions of the two irradiation areas which are distributed at the corresponding four vertex portions of the signal light area are disposed away from each other.

Furthermore, in the inventive example, the spectral element H5 is used. Alternatively, any one of the spectral elements H1 through H4 may be used, in place of the spectral element H5.

Figure 20A:
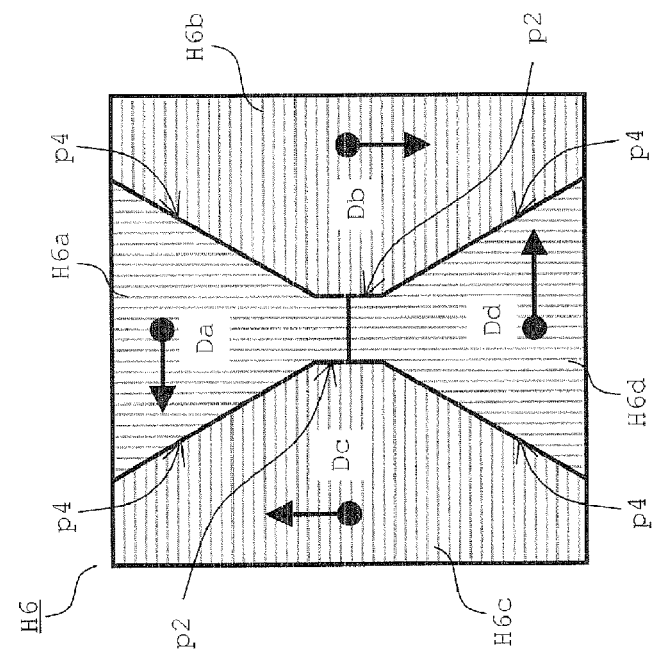
FIGS. 20A and 20B are diagrams showing a modification example of the spectral element in the inventive example.
Figure 20B:
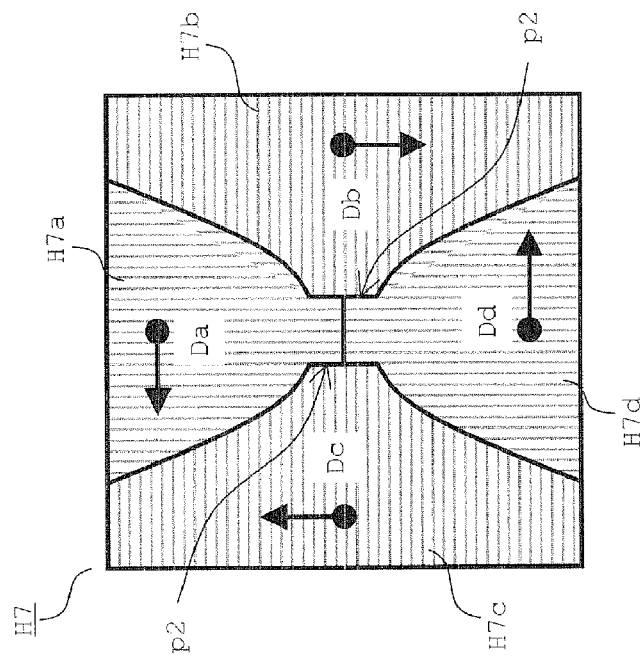

Further alternatively, any one of spectral elements H6, H7 shown in FIGS. 20A, 20B may be used, in place of the spectral element H5 in the inventive example.

FIGS. 20A, 20B are diagrams respectively showing arrangements of the spectral elements H6, H7. The flat surface direction and the curved surface direction of an anamorphic lens, and the direction of a track image of BD light to be entered into each spectral element shown in FIGS. 20A, 20B are the same as those shown in FIG. 7A.

Referring to FIG. 20A, each of the borderlines between the diffraction areas of the spectral element H6 has a vertically extending straight portion p2 near the center of the spectral element H6, and has a straight portion p4 extending in a direction displaced from a horizontally extending straight line by an angle larger than 45 degrees, in a portion other than the center of the spectral element H6. In this arrangement, the surface areas of the diffraction areas H6a, H6d are also set smaller than those of the diffraction areas H6b, H6c.

Referring to FIG. 20B, each of the borderlines between the diffraction areas of the spectral element H7 includes a vertically extending straight portion p2 near the center of the spectral element H7, and includes a curved line at a portion other than the center of the spectral element H7. In this arrangement, the surface areas of the diffraction areas H7a, H7d are also set smaller than those of the diffraction areas H7b, H7c.

The embodiment of the invention may be changed or modified in various ways as necessary, as far as such changes and modifications do not depart from the scope of the claims of the invention hereinafter defined.

What is claimed is:

1. An optical pickup device, comprising:

a laser light source;

an objective lens which focuses laser light emitted from the laser light source on a recording medium;

an astigmatism element into which the laser light reflected on the recording medium is entered, and which converges the laser light in a first direction to generate a first focal line and converges the laser light in a second direction perpendicular to the first direction to generate a second focal line;

a spectral element into which the laser light reflected on the recording medium is entered, and which makes propagating directions of light fluxes entered into first through fourth areas different from each other to disperse the four light fluxes from each other; and a photodetector which receives the dispersed light fluxes to output a detection signal, wherein assuming that an intersection of first and second straight lines respectively in parallel to the first direction and the second direction and perpendicularly intersecting with each other is aligned with a center of the spectral element, the first and second areas are disposed in a direction along which a pair of vertically opposite angles defined by the first and second straight lines are aligned, and the third and fourth areas are disposed in a direction along which the other pair of vertically opposite angles defined by the first and second straight lines are aligned, the astigmatism element is disposed at such a position that the direction along which the first and second areas are aligned is in parallel to a direction of a track image of the recording medium projected onto the spectral element, each of the first and second areas has a surface area larger than a surface area of each of the third and fourth areas, and a boundary portion between the first and second areas, and the third and fourth areas includes a straight portion extending in a direction perpendicular to the direction of the track image.

2. The optical pickup device according to claim 1, wherein four of the straight portions are symmetrically disposed with respect to the center of the spectral element, at a position where a boundary portion of the track image is included therein.

3. The optical pickup device according to claim 1, wherein two of the straight portions are symmetrically disposed with respect to the center of the spectral element, with the center of the spectral element being interposed therebetween in the direction of the track image.

4. The optical pickup device according to claim 1, wherein each of the first and second areas is divided into two parts in a direction perpendicular to the direction of the track image to form four divided areas, each of the third and fourth areas is divided into two parts in a direction in parallel to the direction of the track image to form four divided areas, and the spectral element changes propagating directions of light flux portions each passing through the divided area in such a manner that light flux portions passing through the two divided areas of the first area are dispersed away from each other on the photodetector, light flux portions passing through the two divided areas of the second area are dispersed away from each other on the photodetector, light flux portions passing through the two divided areas of the third area are dispersed away from each other on the photodetector, and light flux portions passing through the two divided areas of the fourth area are dispersed away from each other on the photodetector.

5. The optical pickup device according to claim 4, wherein the spectral element gives an optical function to the light flux portions, the optical function being operative to gradually decrease a clearance, on the photodetector, between each pair of the light flux portions in a direction of a parting line of two sensors which receive the corresponding pair of light flux portions.

6. The optical pickup device according to claim 1, wherein the spectral element changes the propagating directions of the four light fluxes so that each of the light fluxes passing through the first through fourth areas is guided to four different vertex positions of a rectangle, on a light receiving surface of the photodetector.

* * * * *